US006594204B1

(12) United States Patent
Yamamoto et al.

(10) Patent No.: US 6,594,204 B1
(45) Date of Patent: Jul. 15, 2003

(54) LENS HOLDER, METHOD FOR MANUFACTURING LENS HOLDER, METAL DIE FOR PRODUCING LENS HOLDER AND OBJECTIVE LENS DEVICE

(75) Inventors: Kenji Yamamoto, Tokyo (JP); Fumisada Maeda, Tokyo (JP); Kiyoshi Osato, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/532,177

(22) Filed: Mar. 20, 2000

(30) Foreign Application Priority Data

Mar. 31, 1999 (JP) ............................................ 11-094153

(51) Int. Cl.$^7$ ................................................. G11B 7/00
(52) U.S. Cl. .................. 369/44.14; 369/112.24
(58) Field of Search .......................... 369/44.32, 44.23, 369/53.19, 112.23, 112.24, 112.25, 112.26, 44.14, 44.15, 44.22

(56) References Cited

U.S. PATENT DOCUMENTS

| 5,243,580 | A | | 9/1993 | Maeda ......................... 369/13 |
|---|---|---|---|---|
| 5,712,842 | A | * | 1/1998 | Yamamoto et al. .... 369/112.26 |
| 5,729,393 | A | * | 3/1998 | Lee et al. ................. 369/44.15 |
| 5,764,613 | A | * | 6/1998 | Yamamoto et al. ....... 369/44.23 |
| 6,104,691 | A | * | 8/2000 | Yamamoto et al. .... 369/112.24 |
| 6,108,292 | A | * | 8/2000 | Zijp ....................... 369/112.24 |
| 6,115,347 | A | * | 9/2000 | Ichimura et al. ....... 369/112.24 |
| 6,151,174 | A | * | 11/2000 | Hendriks .................. 369/53.19 |
| 6,262,953 | B1 | * | 7/2001 | Kahlman et al. ......... 369/44.11 |
| 6,298,026 | B1 | * | 10/2001 | Suzuki et al. ........... 369/112.24 |
| 6,307,689 | B1 | * | 10/2001 | Ichimura et al. ....... 369/112.24 |
| 6,411,585 | B1 | * | 6/2002 | Kobayashi ............. 369/112.01 |

FOREIGN PATENT DOCUMENTS

| EP | 0 139 979 | 5/1985 |
|---|---|---|
| EP | 0 604 328 | 6/1994 |
| WO | WO 92/20001 | 11/1992 |

* cited by examiner

*Primary Examiner*—Thang V. Tran
*Assistant Examiner*—Bach Vuong
(74) *Attorney, Agent, or Firm*—Oblon, Spivak, McClelland, Maier & Neustadt, P.C.

(57) ABSTRACT

A lens holder which is able to secure plural lenses in an adjustment-free fashion and to achieve relative positioning between the lenses to high precision. To this end, a first reference surface for the optical axis direction $4a1$ and a second reference surface for the optical axis direction $4b1$ of a second mounting portion $4b$ are formed towards the object point side to serve as a reference surface for determining the separation along the optical axis between the first and second lenses 2, 3. The first reference surface for the optical axis direction $4a1$ and the second reference surface for the optical axis direction $4b1$ also operate for controlling the tilt of the lenses 2, 3.

28 Claims, 13 Drawing Sheets

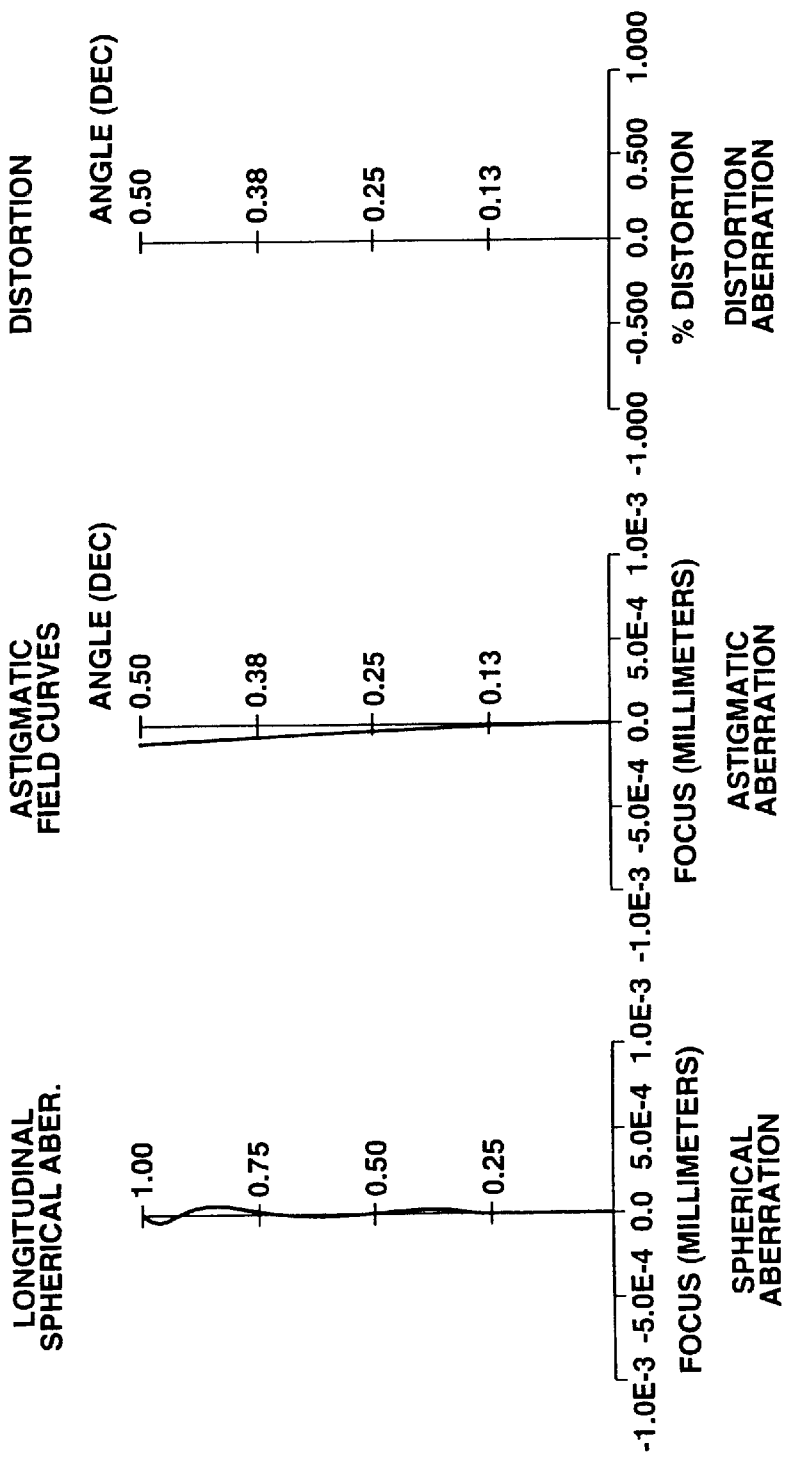

LENS HOLDER, METHOD FOR MANUFACTURING LENS HOLDER, METAL DIE FOR PRODUCING LENS HOLDER AND OBJECTIVE LENS DEVICE

BACKGROUND OF THE INVENTION

1. Field of the Invention

This invention relates to a lens holder for supporting an objective lens loaded on an optical head used for recording and/or reproducing an information recording medium, such as an optical disc. This invention also relates to a method for manufacturing such a lens holder, a metal die used in manufacturing a lens holder and an objective lens device constituted by the objective lens and the lens holder.

2. Description of the Related Art

The information recording mediums, such as a replay-only optical disc, a phase change disc, a magneto-optical disc or an optical card, are finding extensive use for storing the image information, speech information or data for computer programs. Thus, the demand for raising the recording density and the recording capacity of these information recording mediums is increasing year by year.

For increasing the recording density of the information recording medium, it is effective to increase the numerical aperture NA of the objective lens or to shorten the light emission wavelength of the light source. For example, in an optical head for a Compact Disc (CD), which is a digital optical disc or recording mainly music signals, the numerical aperture NA of the objective lens and the light emission wavelength of the light source are 0.45 and 780 nm, respectively, whereas, in a so-called optical head for the Digital Versatile Disc (DVD), numerical aperture NA of the objective lens and the light emission wavelength of the light source are 0.6 and 650 nm, respectively. With this DVD, the recording density is improved over that with the CD to render it possible to record picture signals.

The objective lens, used for recording and/or reproducing the information for the routine CD or DVD, is prevalently a single non-spherical lens molded from glass or plastics. This single non-spherical lens, carried by a lens holder, makes up an objective lens device, and is loaded on the optical head. For example, the single non-spherical lens is bonded to and mounted on a reference surface of the lens holder. The lens holder, carrying this single non-spherical lens, is loaded with pre-set accuracy on the optical head.

Recently, a higher recording density and a larger recording capacity of the information recording medium are desired, such that a larger numerical aperture NA of the objective lens and the wavelength of the light radiated from picture signals shorter than e.g., 650 nm are required.

It is however impossible to produce the single non-spherical lens with the numerical aperture NA not smaller than 0.75 because of difficulties in metal die machining and in controlling the eccentricity at the time of lens molding. That is, in machining a metal die for molding the single non-spherical lens with the numerical aperture NA not less than 0.75 the tilt angle of the lens surface with respect to the optical axis in the vicinity of the lens is less than 40°, so that machining becomes difficult in consideration of the size of the distal end of the cutting edge, such as a diamond byte. Also, if the curvature of the lens surface is increased, the sag (depth along the optical axis from the apex of the lens surface to the outer rim of the lens) is increased to render metal die machining difficult. For this reason, it is retained to be difficult to constitute an objective lens with a numerical aperture NA not less than 0.75 as a single lens.

Recently, as a technique of realizing an objective lens with the numerical aperture NA of not less than 0.75, a double set objective lens has come to be used. With this double set objective lens, the objective lens is constituted by plural lenses to diminish the refractive power of each lens. This renders it possible to increase the radius of curvature of the non-spherical lens surface to manufacture an objective lens with the numerical aperture NA not less than 0.75.

However, with the double set objective lens, with a large numerical aperture NA, an extremely high precision is required as the relative lens position accuracy when assembling the plural lenses into one set. For example, micron order accuracy is required of the eccentricity and spacing between the lenses, whilst the minute order accuracy is required of the lens tilt. By making three-dimensional position adjustment, it is sufficiently possible to assemble the lens to meet this precision requirement. However, this three-dimensional position adjustment is in need of an expensive jig and an advanced position adjustment technique and hence does not lend itself to a mass production process.

As means for positioning the lenses to assemble them to a sole lens unit, it may be envisaged to assemble the respective lenses in the lens holder whose reference portion having a reference surface for mounting the lenses thereon has been formed to high precision.

The reference portion formed in the lens holder is set to a shape capable of positioning the respective lenses as to the lens offset, tilt and the lens-to-lens separation. The lens offset, tilt and separation are referred to below as three elements. By forming the reference portion to high precision with respect to these three elements, the objective lens can be assembled to high precision without requiring the position adjustment of the respective lenses. That is, the objective lens can be assembled to high precision solely by sufficiently optimizing the shape designing of the lens holder.

The shape of the lens holder is hereinafter explained inclusive of the presumed manufacturing method. FIGS. 15 and 16 show the structure of an objective lens device 201 having a first lens 202 and a second lens 203 of the double set objective lens set assembled into a lens holder 204.

The first lens 202 is a lens into which falls the laser light radiated from a light source, not shown. The first lens 202 has its mid portion facing the second lens 203, referred to below as the radiating surface, is formed as a non-spherical lens surface 202*a*, on an outer rim of which is formed a planar portion perpendicular to the optical axis. On the other hand, the surface to which falls the light radiated from the light source, and which is the opposite surface of the first lens 202, has its mid portion formed to a non-spherical lens surface 202*b*. On the outer rim of the lens surface 202*b* is formed a planar portion perpendicular to the optical axis. The above-mentioned opposite surface is referred to below as the incident surface.

The second lens 203 is a lens of the double set objective lens set which opposes to a digital optical disc, such as a phase change optical disc or a magneto-optical disc. The surface of the second lens 203 facing the disc, not shown, referred to below as the facing surface, is formed to a planar shape, whilst the mid portion of the surface facing the first lens 202 as the opposite surface, referred to below as the incident surface, is formed as a non-spherical lens surface 203*b*. On the outer rim of the lens surface 203*b* is formed a planar section perpendicular to the optical axis.

The side of the objective lens device 201 on which falls the light radiated from the light source is termed an object point side, whilst the side of the objective lens device 201 lying along the disc arraying direction, that is the side on which an image point is formed by the objective lens device 201 by the light radiated from the light source, is termed an image point side. Thus, with the first and second lenses 202, 203, non-spherical lens surfaces are formed on the object side.

The lens holder 204 is formed substantially to a toroidal shape. On the inner peripheral side of the object point is formed a first mounting portion 204a carrying the first lens 202, whereas, on the inner periphery on the image point side, there is formed a second mounting portion 204b carrying the second lens 203.

The first mounting portion 204a is formed step-wise as one with the inner rim of the image point side aperture, and is formed as one from a first axial reference surface 204a1 formed facing the object point side and from a cylindrically-shaped radial reference surface 204a2 having the optical axis as axis.

The second mounting portion 204b is formed as-one step-wise on the inner rim of the aperture on the image point side from a second axial reference surface 204b1 formed facing the object point side and from a cylindrically-shaped radial reference surface 204b2 having the optical axis as axis. This lens holder 204 is prepared e.g., by molding from synthetic resin.

In the above-described lens holder 204, the first axial reference surface 204a1 of the first mounting portion 204a and the second axial reference surface 204b1 of the second mounting portion 204b serve as a reference surface determining the separation along the optical axis of the first and second lenses 202, 203. On the other hand, the first axial reference surface 204a1 and the second axial reference surface 204b1 also act as a reference surface for controlling the tilt of the first and second lenses 202, 203. It may be said that the orientation of the first axial reference surface 204a1 and that of the second axial reference surface 204b1 are at 180° along the optical axis. The radial reference surface 204a2 of the first mounting portion 204a and the radial reference surface 204b2 of the second mounting portion 204b act as a reference surface determining the positions of the first and second lenses 202, 203 along the radius of the lens.

On this lens holder 204, the first lens 202 is mounted by its outer rim 202c on the first mounting portion 204a. The second lens 203 is mounted by its outer rim203c on the second mounting portion 204b.

This lens holder 204 is produced by die molding. For example, it is manufactured using a male die shown in FIG. 17, referred to below as a first metal die, and a female mold 302, referred to below as a second metal die. When the dies 301, 302 are assembled as shown in FIG. 17, a molding material 204a for producing the lens holder 204 is charged into a cavity between the first metal die 301 and the second metal die 302 to mold the lens holder 204.

In this metal die for manufacturing the lens holder, the first metal die 301 is provided with a molding portion 301a for forming the first mounting portion 204a, referred to below as the first mounting portion molding portion 301a, whilst the second metal die 302 is provided with a molding portion 302a for forming the second mounting portion 204b, referred to below as the second mounting portion molding portion 302a.

The first metal die 301 is made up of a base 301b and a projection 301c provided on this base 301b, and is generally formed to substantially a convexed shape, as shown in FIGS. 17 and 18.

The base 301b is formed substantially to a flat plate shape. This base 301b is provided with a projection 301c at a mid portion of the major surface 301b1 in a direction towards the second metal die 302. This direction towards the second metal die 302 is the direction towards the image point of the double objective lens set 201 and is referred to below as the image point side direction. The vicinity of the outer rim of the major surface 301b1 of the base 301b is an abutment surface 301b2 compressing against an abutment surface 302b21 of the second metal die 302.

The projection 301c is formed with steps 301d, 301e, 301f which become progressively lesser in diameter in a direction towards an image point side, as also shown in FIG. 19. In this projection 301c, the major surface 301f1 of the step 301f as the distal end of the projection 301c serves as the surface of the second metal die 302 compressing against the major surface 302c1 of the second metal die 302. In this first metal die 301, the first molding portion 301a is made up of a surface 301a1 facing the image point side of the outer rim of the step 301d and an outer rim surface 301a2 of the step 301d.

The second metal die 302 is made up of a base 302b and a projection 302c set upright at a mid portion on the major surface 302b11. The base 302b is made up of a substantially flat-plate shaped bottom 302b1 and a sidewall section 302b2 set upright on the outer rim of the major surface 302b in a direction of the first metal die 301, that is in a direction towards the object point side of the double objective lens set 201, referred to below as an object point side direction.

In the second metal die 302, the sidewall section 302b2 is a portion lying on the outer rim of the projection 301c of the first metal die 301 and has an end face as an abutment surface 302b21 compressing against the abutment surface 301b2 of the first metal die 301.

The major surface 302c1 of the projection 302c is an abutment surface against the major surface 301f1 of the first metal die 301.

The metal dies 301, 302, thus configured, are assembled as shown in FIG. 17, and the molding material 204a is charged as shown in FIG. 18 to mold the lens holder 204 by die molding.

With the metal dies 301, 302, thus assembled together, the molding material 204a is charged to produce the lens holder 204 whereby the lens holder 204 is formed as one with reference surfaces for positioning the lenses 202, 203, so that these lenses may be assembled to a double objective lens set without increasing cost or time.

In assembling plural lenses, precision in the above-mentioned three elements, that is the offset, tilt and the separation, is required. That is, the lens holder 204 needs to be shaped to this precision.

However, in the above-described lens holder manufacturing method, the first mounting portion 204a or positioning the first lens 202 is formed by the first metal die 301, whilst the second mounting portion 204b for positioning the second lens 203 is formed by the second metal die 302, so that, if the molding material 204a is charged in a state in which the second metal die 302 is not properly positioned with respect to the first metal die 301, there is produced offset in the above-mentioned three elements.

For example, if the molding material 204a is charged in a state in which the second metal die 302 is positioned with an offset from the pre-set position, as shown in FIG. 20, there is directly produced an offset as to the offset, tilt or the separation between the first lens 202 and the second lens 203 assembled in the molded lens holder 204.

Specifically, should the second metal die 302 be offset relative to the first metal die 301, as shown in FIG. 20, there is produced an offset in eccentricity X due to the offset of a center axis O2 of the second metal die 302 with respect to the center axis O1 of the first metal die 301. On the other hand, there are produced an offset θ of tilt due to the inclination of the center axis O2 of the second metal die 302 with respect to the center axis O1 of the first metal die 301 and an offset Z due to separation of the second metal die 302 from the first metal die 301. These offsets represent an amount of deviation between the first molding portion 301a on the first metal die 301 for molding the first mounting portion 204a and the second molding portion 302a on the second metal die 302 for molding the second mounting portion 204b. If the first and second lenses 202, 203 are assembled in the lens holder 204 molded in such a state that the second metal die 302 has such the offsets with respect to the first metal die 301 as to the three elements, as shown in FIG. 21, the offset X in eccentricity, offset Y in tilt and the offset Z in the separation add to the error ascribable to the shape of the metal dies 301, 302, that is to the metal die producing error.

The metal die producing error of approximately 3 μm for the eccentricity and separation and that of approximately 0.02° for the tilt may be estimated to be produced, so that, if the first metal die 301 is offset from the second metal die 302, there is produced an error between the first and second lenses 202, 203 in an amount corresponding to the metal die producing error plus the amounts of deviation between the metal dies 301, 302. Since the eccentricity and the separation between the metal dies are estimated to be approximately 10 μm, whilst the tilt of approximately 0.0670 is estimated in die molding, these offsets add up to each other so that the eccentricity and the separation amount to approximately 13 μm, whilst the tilt is approximately 0.087°.

If, in the above-described lens holder manufacturing method, in which the first mounting portion 204a carrying the first lens 202 and the second mounting portion 204b carrying the second lens 203 are produced using separate metal dies, an offset is produced at the time of assembling the first and second metal dies 301, 302, this offset translates itself as the offset in the reference surface usable as a reference in mounting the first and second lenses 202, 203. The result is that the relative position between the first and second lenses 202, 203 assembled in position deviate from the desired relative position.

SUMMARY OF THE INVENTION

It is therefore an object of the present invention to provide a lens holder, a method for manufacturing lens holder, metal die for producing lens holder and objective lens device constructed using the lens holder, in which plural lenses can be secured to high precision without adjustment, and in which relative lens positions can be positioned to high accuracy.

In one aspect, the present invention provides a lens holder carrying an objective lens formed by a plurality of lenses arrayed on an optical axis of an optical head adapted for recording and/or reproducing information signals for an information recording medium using the laser light, with the plural lenses making up an objective lens device. A plurality of reference surfaces respectively carry the object point side lenses for controlling the positions along the optical axes and the tilt of the lenses. The object point side reference surfaces control the positions along the optical axes and the tilt of the lenses.

In this lens holder, the reference surfaces are formed by machining from the same direction.

In another aspect, the present invention provides a method for manufacturing a lens holder carrying an objective lens formed by a plurality of lenses arrayed on an optical axis of an optical head adapted for recording and/or reproducing information signals for an information recording medium using the laser light, by injection molding means, using a metal die including at least a female die and a male die, object point side lenses making up an objective lens device. A reference portion forming portion constituting a plurality of reference portions for object point side lens holder respectively carrying object point side plural lenses are formed on one of object point side male die or the female die.

In this manufacturing method for the lens holder, the reference portions of the lens holder are formed by the reference portion molding portion provided on the male die or the female die.

In still another aspect, the present invention provides a metal die for manufacturing a lens holder having at least a female die and a male die, with the object point side metal die being used for manufacturing a lens holder carrying an objective lens formed by a plurality of lenses arrayed on an optical axis of an optical head adapted for recording and/or reproducing information signals for an information recording medium using the laser light, with the object point side lenses making up an objective lens device. A reference portion molding portion for forming a plurality of reference portions of the lens holder for respectively mounting object point side lenses is formed on one of the female die and the male die.

In the metal die for manufacturing a lens holder, the reference portions of the lens holder are formed by the reference portion molding portion provided on the male die or the female die.

In still another aspect, the present invention provides an objective lens device for an optical head adapted for recording and/or reproducing information signals for an information recording medium using the laser light, with the object point side lenses making up an objective lens device. The object point side objective lens device includes an objective lens made up of a first lens and a second lens, and a lens holder supporting object point side objective lens. At least one surface of the first and second lenses having a mid portion formed as a lens surface, with the vicinity of the outer rim of object point side at least one surface proving a planar section perpendicular to the optical axis. The object point side lens holder has a first reference surface and a second reference surface for mounting object point side first and second lenses, respectively, for controlling the tilt and the positions along the optical axes of the lenses. The object point side reference surfaces are oriented in one direction along the optical axis. A planar portion of object point side first lens is co-planar as the first reference surface to support object point side first lens, with a planar portion of object point side second lens being co-planar as the second reference surface to support object point side second lens.

With the lens holder of the present invention, in which there are formed plural reference surfaces for mounting plural lenses for controlling the tilt and the positions along the optical axis direction of the respective lenses are provided in one direction along the optical axis direction, the reference surfaces can be formed by machining from the same direction.

By this lens holder, plural lenses can be positioned and secured to high precision in an adjustment-free fashion to enable high-precision positioning between the respective lenses.

In the lens holder manufacturing method according to the present invention, in which there are used metal dies carrying a reference portion molding portion adapted for forming plural reference portions of the lens holder, in one of the male and female dies of which the plural lenses are mounted, the reference portions of the lens holder can be formed by the reference portion molding portion formed on one of the male and female dies.

With the lens holder manufacturing method, plural lenses can be secured to high accuracy in an adjustment-free fashion, so that positioning between the lenses can be realized to high precision.

In the metal die for manufacturing the lens holder according to the present invention, in which there is provided a reference portion molding portion for forming plural reference portions of the lens holder, on a male die or a female die of which plural lenses are mounted, the reference portions of the lens holder can be formed by the reference portion molding portion formed in the male die or in the female die.

With the metal die for manufacturing the lens holder, it is possible to manufacture a lens holder on which plural lenses can be positioned to high precision in an adjustment-free fashion, such that the positioning between the lenses can be achieved to high precision.

On the objective lens device of the present invention, having the above-mentioned lens holder, plural lenses of the objective lens constituting the objective lens are secured in position to high precision in an adjustment-free fashion.

BRIEF DESCRIPTION OF THE DRAWINGS

FIGS. 11A 11B and 11C are graph showing the spherical aberration, astigmatic aberration and distortion aberration of the double lens set.

DESCRIPTION OF THE PREFERRED EMBODIMENTS

Figure 1:
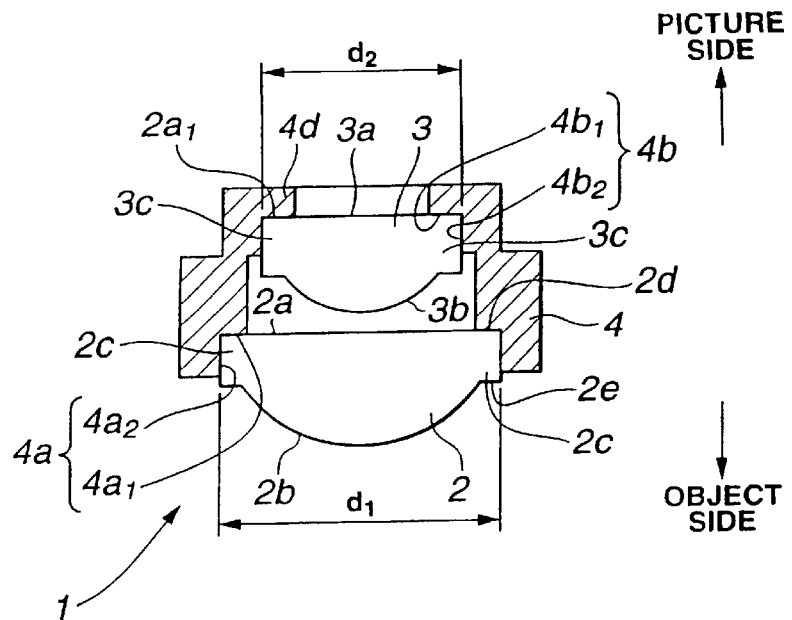
FIG. 1 is a longitudinal cross-sectional view showing the structure of an objective lens device in which two objective lens sets are held by a lens holder according to a first embodiment of the present invention.

Referring to the drawings, preferred embodiments of according to the present invention will be explained in detail. The first embodiment is directed to a lens holder carrying a double objective lens set used in recording and/or reproducing the information on or from an information recording medium. The information recording medium is a replay-only optical disc, a phase-change optical disc, a magneto-optical disc or an optical card. In the following, the information recording medium is simply referred to as a disc.

On a lens holder 4 are mounted a first lens 2 and a second the lenses 3, making up a double lens set, as shown in FIG. 1. The lenses 2, 3, thus assembled in the lens holder 4, are arranged on the optical axis to constitute an objective lens. The optical system, constituted by the lenses 2, 3, represents a so-called infinite system in which an object point is located at an infinite far position. The double lens set has a numerical aperture NA not less than 0.75. The configuration comprised of the lens holder 4 and the lenses 2, 3 assembled into the lens holder 4 is referred to below as an objective lens device 1.

The first lens 2 is a lens on which falls the laser light radiated from a light source, not shown. A mid portion of the surface of the first lens 2 facing the second lens 3, referred to below as the radiating surface, is formed as a non-spherical lens surface 2a. An outer edge of the lens surface 2a is formed with a planar portion perpendicular to the optical axis. The opposite side surface of the first lens 2, on which falls the light radiated from the light source, referred to below as the incident surface, has its mid portion formed as a non-spherical lens surface 2b. On an outer rim side of the lens surface 2b is formed a planar section perpendicular to the optical axis.

The second lens 3 is a lens in the objective lens device 1 facing the disc. The surface 3a of this second lens 3, facing the disc, not shown, is planar, while the opposite surface of the second lens 3, facing the first, lens 2, has a mid portion formed as a non-spherical lens surface 3b, and the outer edge of the lens surface 3b is formed with a planar portion 3d perpendicular to the optical axis. The surface 3a is referred to below as the facing surface, whilst the opposite surface is referred to below as the incident surface. This second lens 3 has an outside diameter d2 smaller than the outside diameter d1 of the first lens 2 (d1>d2).

In the following explanation, the side of the objective lens device 1 on which falls the outgoing light from the light source is termed the object point side and the side of the objective lens device 1 facing the disc, that is the side of the objective lens device 1 in which an image is formed by the light radiated from the light source, is termed an image point. Therefore, both the first and second lenses 2, 3 are formed on the object point sides thereof with non-spherical lens surfaces.

The first and second lenses 2, 3 may both be the same as the first and second lenses 2, 3 explained in connection with the related art. That is, the lens holder 4 according to the present invention may be formed by unified lenses 2, 3 to constitute the objective lens device 1 without machining the lens shape.

The lens holder 4 is toroidally shaped and is formed with a mounting portion 4a for the first lens 2 and a mounting portion 4b for the second lens 3 on the inner sides facing the object and on the image point side, respectively. The lens holder 4 is also formed with reference surfaces for the optical axis direction 4a1, 4b1 for controlling the positions and the tilts along the direction of the optical axis of the lenses 2, 3 so that these reference surfaces are oriented in the sole direction that is the optical axis direction. The lenses 2, 3 are mounted on the reference surfaces for the optical axis direction 4a1, 4b1. Meanwhile, the lens holder 4 is formed of a thermohardening resin material.

The mounting portion 4a for the first lens 2, referred to below as the first mounting portion, is formed step-wise as one on the inner rim of the object point side aperture, and is formed with a reference surface for-the optical axis direction 4a1 facing the object and with a cylindrically-shaped reference surface for the radial direction 4a2 having the optical axis as its axis. The reference surface for the radial direction 4a2 is of a diameter slightly smaller than the outside diameter d1 of the first lens 2.

The mounting portion 4a for the first lens 2, referred to below as the first mounting portion, is formed on the object point side of a projection 4d extending from the inner peripheral surface of the object point side aperture along the radius of the second lens 3, and is formed with a second reference surface for the optical axis direction 4b1 facing the object and with a cylindrically-shaped reference surface for the radial direction 4b2 having the optical axis as its axis. The reference surface for the radial direction 4b2 is of a diameter slightly smaller than the outside diameter d2 of the second lens 3.

In the lens holder 4, arranged as explained above, the first reference surface for the optical axis direction 4a1 of the first mounting portion 4a and the second reference surface for the optical axis direction 4b1 of the second mounting portion 4b are oriented towards the object point side and act as reference surfaces in determining the separation between the first and second lenses 2, 3 along the optical axis direction. The first reference surface for the optical axis direction 4a1 and the second reference surface for the optical axis direction 4b1 also act as reference surfaces for controlling the tilt of the lenses 2, 3. The directions of the first reference surface for the optical axis direction 4a1 and the second reference surface for the optical axis direction 4b1 along the optical axis are the same in contradistinction from the aforementioned lens holder 204 in which these directions are 180° different from each other. On the other hand, the reference surface for the radial direction 4a2 of the first mounting portion 4a and the reference surface for the radial direction 4b2 of the second mounting portion 4b act as reference surfaces determining the radial positions of the first and second lenses 2, 3.

The first mounting portion 4a is of larger diameter than the second mounting portion 4b, that is, the first mounting portion 4a and the second mounting portion 4b are formed on the inner peripheral side of the lens holder 4 for facing outwards, that is towards the object.

On the lens holder 4, configured as explained above, the first lens 2 has its outer rim 2c mounted on the first mounting portion 4a. The second lens 3 has its outer rim 3c mounted on the second mounting portion 4b.

The first and second lenses 2, 3 are mounted on the lens holder 4 by press-fitting because the diameter of the reference surface for the radial direction 4a2 of the first mounting portion 4a adapted as a mounting portion for the first lens 2 is slightly smaller than the outside diameter d1 of the first lens 2, the diameter of the reference surface for the radial direction 4b2 of the mounting portion 4b of the second lens 3 is slightly smaller than the outside diameter of the second lens 3, and the lens holder 4 is formed of a resin material.

If the objective lens device 1 is assembled by press-fitting the lenses 2, 3 on the lens holder 4, the lenses 2, 3 may be designed as lenses which take into account the deformation caused by the press fitting. After press-fitting the lenses 2, 3 to the lens holder 4, the lenses 2, 3 may be secured to the lens holder 4 using, for example, a UV light curable resin.

The manufacturing method for the lens holder 4 is now explained. The lens holder 4 is manufactured using a male die 51 (first metal die) shown in FIG. 2, and a female mold 52 (second metal die). When the dies 51, 52 are assembled as shown in FIG. 3, a molding material (thermohardening resin material) 4a for producing the lens holder 4 is charged into a cavity between the first metal die 51 and the second metal die 52 to mold the lens holder 4.

The first metal die 51 of the metal mold used for producing the lens holder 4 is provided with a molding portion for firming the entire lens mounting portion. That is, a molding portion (first mounting portion molding portion) 51i for forming the first mounting portion 4a and a molding portion (second mounting portion molding portion) 51j for forming the first mounting portion 4a are provided on the first metal die 51.

The first metal die 51 is made up of a base 51b and a projection 51c provided on this base 51b, and is substantially convex-shaped in its entirety.

The base 51b is substantially of a planar plate configuration. The base 51b has a projection 51c at a mid portion of the major surface 51b1 lying in a direction of the second metal die 52, that is in a direction towards the image of the objective lens device 1, referred to below as the image point side direction. The vicinity of the outer rim of the major surface 51b1 of the base 51b serves as an abutment surface 51b2 compressing against the abutment surface 52c1 of the second metal die 52.

The projection 51c is made up of steps 51d, 51e, 51f and 5g progressively decreasing in diameter towards the image point side. In the projection 51c, the major surface 52g1 of the step 51g at the distal end serves as the abutment surface against the major surface 52b1 of the second metal die 52, as will be explained subsequently.

In this first metal die 51, the first mounting portion molding portion 51i is made up of a surface 51d1 facing the image point side of the outer periphery of the step 51d and an outer peripheral surface 51d2 of the step 51d, whilst the second mounting portion molding portion 51j is made up of a surface 51f1 facing the image point side of the outer periphery of the step 51f and an outer peripheral surface 51f2 of the step 51f.

The second metal die 52 is made up of a bottom 52b, substantially in the form of a planar plate, and a sidewall section 52c, lying on the outer peripheral surface of the bottom 52b and which is set upright on the outer rim of the major surface 52b1 in the direction in which the first metal die 51 is positioned, that is in the direction towards the object point side of the objective lens device 1, referred to below as the object point side direction. The second metal die 52 in its entirety is of a substantially recessed configuration.

The vicinity of the center of the major surface 52b1 of the bottom 52b is an abutment surface compressing against the major surface 51g of the step 51g of the first metal die 51. The sidewall section 52c is a portion of the second metal die 52 lying on the outer rim of the projection 51c of the first metal die 51, with an end face 52c1 being an abutment surface compressing against the abutment surface 51b2 of the first metal die 51.

Figure 2:
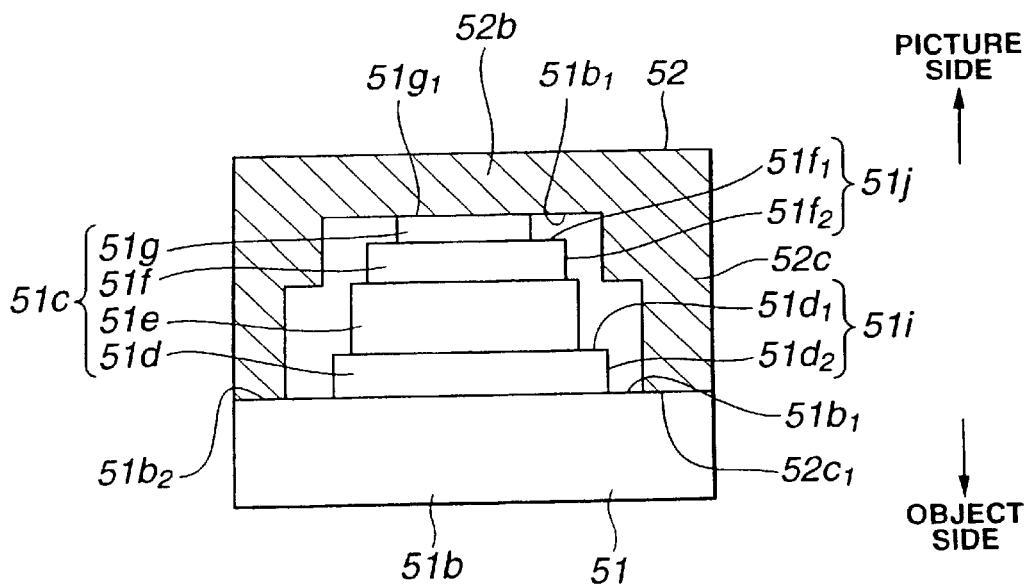
FIG. 2 is a longitudinal cross-sectional view showing a metal die and a second metal die used in producing the lens holder.
Figure 3:
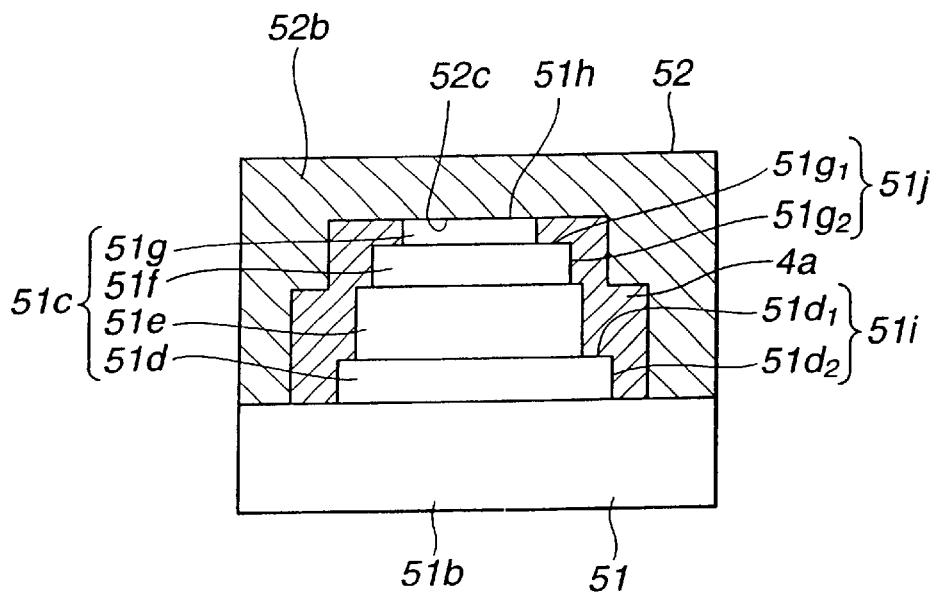
FIG. 3 is a longitudinal cross-sectional showing a metal die for producing the lens holder into which is charged the material for molding the lens holder.

With the metal molds 51, 52 assembled together as shown in FIG. 2, the molding material 4a is charged into a gap of the metal molds 51, 52, as shown in FIG. 3, to produce the lens holder 4 by die molding.

The first mounting portion 4a is formed by the first mounting portion molding portion 51i formed on the first metal die 51, whilst the second mounting portion 4b is formed by the second mounting portion molding portion 51j. Specifically, the lens holder 4 is molded from the first metal die 51 and the second metal die 52, whilst the first mounting portion 4a and the second mounting portion 4b are formed by one of the dies, that is by the first metal die 51. Stated differently, the second metal die 52 operates only as a metal die for molding the outer lateral side of the lens holder 4.

It is now assumed that, in the manufacturing process of the lens holder 4, the molding material 4 is charged as offset is produced between the first and second lenses 52, 53 as to eccentricity, tilt and separation to mold the lens holder 4. Specifically, it is assumed that the second metal die 52 is offset with respect to the first metal die 51, as shown in FIG. 4.

Figure 4:
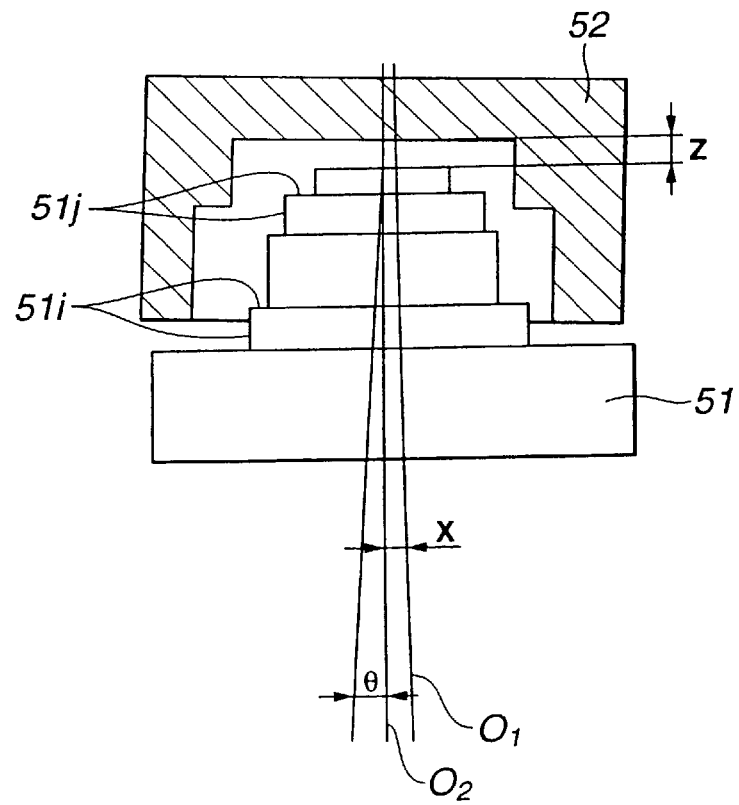
FIG. 4 is a longitudinal cross-sectional showing a metal die for manufacturing the lens holder in which the second metal die is offset from the second metal die.
Figure 5:
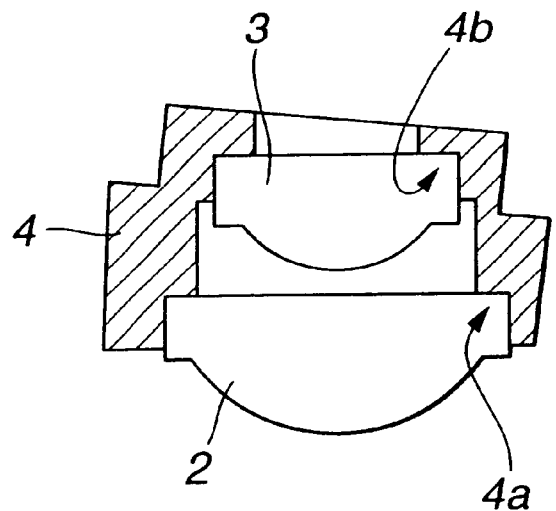
FIG. 5 is a longitudinal cross-sectional view showing an objective lens device having a lens holder formed as the second metal mold is offset from the first metal die.

Specifically, should the second metal die 52 be offset relative to the first metal die 51, as shown in FIG. 4, there is produced an offset in eccentricity X due to the offset of a center axis O2 of the second metal die 52 with respect to the center axis Objective lens device 1 of the first metal die 51. On the other hand, there are produced an offset θ of tilt due to the inclination of the center axis O2 of the second metal die 52 with respect to the center axis Objective lens device 1 of the first metal die 51 and an offset Z due to separation of the second metal die 52 from the first metal die 51.

However, if the second metal die 52 is offset relative to the first metal die 51, such that offsets X, θ and Z are produced as to the three elements of the eccentricity, tilt and the separation, the first and second mounting portion molding portions 51i, 51j are not affected by these offsets, since the first mounting portion molding portion 51i and the second mounting portion molding portion 51j are formed on the first metal die 51. Thus, the first mounting portion 4a and the second mounting portion 4b are formed are formed in the lens holder 4 without being affected by the position shift of the first and second metal dies 51, 52.

The above is the explanation on the lens holder 4 of the first embodiment, the manufacturing method for the lens holder 4, the metal die for manufacturing the lens holder 4 and an objective lens device.

The lens holder 4 of the second embodiment is hereinafter explained. The lens holder 4 of the first embodiment includes a projection 4d on the outer rim of a counter-surface 3a of the second lens 3 facing the optical disc. The lens holder 4 of the second embodiment, now explained, is able to hold the second lens 3 without arranging any portion of the constituting portion on the counter-surface 3a of the second lens 3.

The lens holder 14 is formed subsequently toroidally. On the inner peripheral surface of the lens holder 4, there are formed mounting portions 14a, 14b of the first and second lenses 2, 3.

The first mounting portion 14a is substantially of the same profile as the above-mentioned lens holder 4. That is, the first mounting portion 14a is formed as a step as one with the inner periphery of the aperture of the object point side, and is formed as-one from a first reference surface along the optical axis 14a1, facing the object point side of the first lens 2, and a cylindrically-shaped reference surface in the radial direction 4a2, having an optical axis as the axis.

On the other hand, the second mounting portion 14b is provided on the image point side aperture, and includes a cylindrically-shaped reference surface in the radial direction 4a2, having the optical axis as the axis. The second mounting portion 14b is not provided with the function of controlling the position and tilt in the optical axis direction of the second lens 3. Thus, the lens holder 14 is in. need of means for controlling the second lens 3 as to the position and tilt along the optical axis direction.

Figure 7:
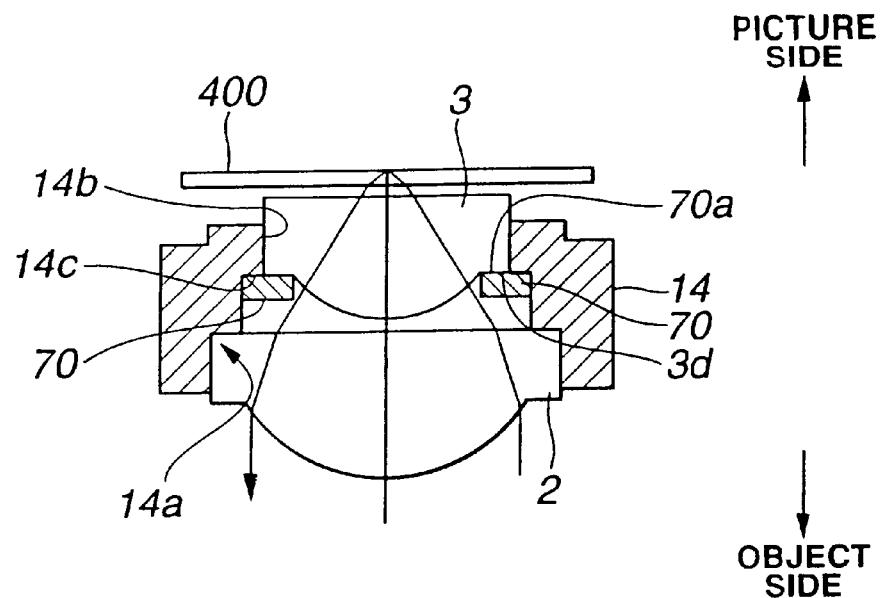
FIG. 7 is a longitudinal cross-sectional view showing the state in which a holder for controlling the position along the optical axis and the tilt of the second lens is mounted on the lens holder as the second embodiment.
Figure 8:
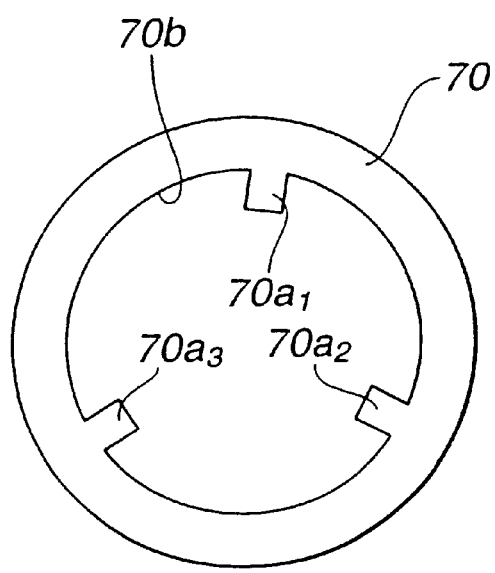
FIG. 8 is a plan view showing the structure of the holder.

Referring to FIG. 7, means for controlling the position along the optical axis and the tilt of the second lens 3 is explained. In FIG. 7, the second lens 3 is positioned along the optical axis and as to the tilt of the second lens 3 with a holder 70 of the substantially flat-plate-shaped annular holder 70 in the lens holder 14. That is, there is provided the holder 70 as having the function of controlling the position along the optical axis and the tilt of the second lens 3, similarly to the projection 4d of the lens holder 4. This holder 70 is arranged on the object point side with respect to the second lens 3 and, by an image point side reference surface 70a of the holder 70, the planar surface portion 3d of the second lens 3 and a mounting surface 14c formed on the inner peripheral surface of the lens holder 14 towards the object are made flush with each other to control the direction of the optical axis position and the tilt of the second lens 3. That is, the direction of the reference surface along the optical axis is changed 180° in the direction along the optical axis to control the position along the optical axis and the tilt of the second lens 3.

Specifically, the holder 70 is mounted on the lens holder 14 by inserting the holder 70 into the inside through an opening of the lens holder 14 in which to mount the first lens 2, in such a state in which the first and second lenses 2, 3 are not mounted on the lens holder 14. The inner surface of the lens holder 14 is formed with a mounting surface 14*c* facing the object point side. The holder 70 is mounted on this amounting surface 14*c*.

By mounting the holder 70 on the lens holder 14, the reference surface 70*a* of the holder 70 is projected in the radial direction of the lens towards the optical axis into abutment against the planar portion 3*d* of the second lens 3 to serve as a reference surface directed to the image point side.

That is, the first lens 2 is mounted on the lens holder 14, whilst the second lens 3 is mounted on the reference surface 70*a* of the second lens 3. In mounting the second lens 3 on the lens holder 14, the planar portion 3*d* of the incident surface 3*b* of the second lens 3 is abutted against the reference surface 70*a*. This positions the second lens 3 as it is controlled in the position along the optical axis and tilt. Thus, in reality, the mounting portion 14*c* formed on the lens holder 14 in the same direction as the first reference surface along the optical axis 14*a*1 of the first mounting portion 14*a* has a function similar to the second reference surface for the optical axis direction 4*b*1 of the lens holder 4 to operate as the second reference surface for the optical axis direction which controls the position along the optical axis and the tilt of the second lens 3.

The holder 70 can be configured so that an imaginary surface including each apex point of the projection supporting the lens at at least three positions proves the reference surface 70*a*. Specifically, the reference surface 70*a* of the holder 70 is configured as boss-like projections 70*a*1, 70*a*2, 70*a*3 on its inner peripheral surface. This controls and sets the position along the optical axis and tilt of the second lens 3 by the reference surface comprised of the imaginary plane containing the projections 70*a*1, 70*a*2, 70*a*3.

The holder 70 may be dismounted after mounting the second lens 3 from the lens holder 14. Alternatively, the holder 70 may remain attached to the lens holder 14. If the holder 70 is adapted to be dismountable from the lens holder 14, the second lens 3 may be secured to the lens holder 14, using the adhesive, and subsequently the holder 70 is dismounted.

By having the holder dismountable after loading the second lens 3 on the lens holder 14, the objective lens device 1 in its entirety can be reduced in weight to improve the performance of the actuator driving the objective lens device 1.

Figure 9:
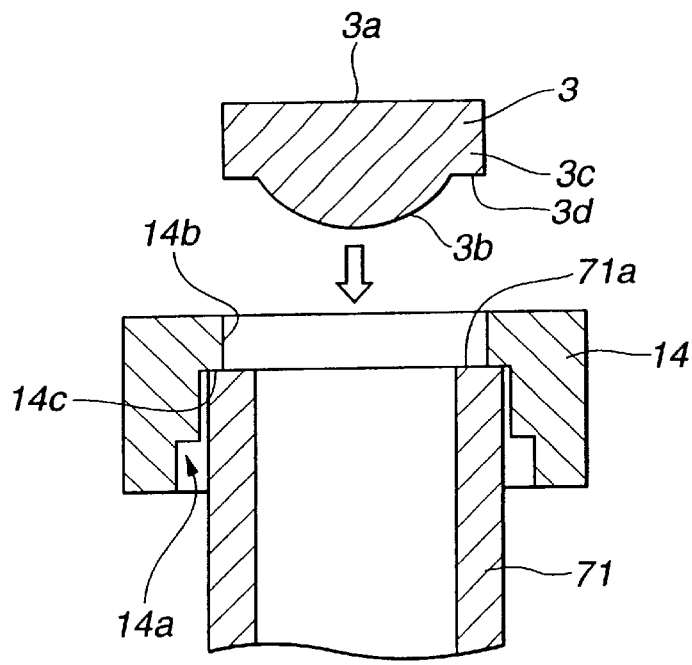
FIG. 9 is a longitudinal cross-sectional view showing the state in which a jig for controlling the position along the optical axis and the tilt of the second lens is mounted on the lens holder as the second embodiment.

The second lens 3 may also be positioned using a cylindrical jig 71 having the end face shaped correspondingly to the major surface of the holder 70 in place of the above-described holder 70. That is, the second lens 3 may be positioned with respect to the direction of the optical axis and tilt by attaching a subsequently cylindrically-shaped jig 71, as shown in FIG. 9. That is, the jig 71 is used as having the function of controlling the position along the optical axis of the second lens 3 and is arranged on the object point side with respect to the second lens 3. By the reference surface 71*a* as an image point side end face (reference surface 71*a*), the planar portion 3*d* of the second lens 3 and the mounting surface 14*c* formed towards the object point side on the inner peripheral surface of the lens holder 14 are made flush with each other to control the position along the optical axis and the tilt of the second lens 3. That is, the position along the optical axis and the tilt of the second lens are controlled by converting the direction of the reference surface along the direction of the optical axis by 180°.

Specifically, in loading the jig 71 on the lens holder 14, the jig 71 is inserted into the inside through an opening, in which to mount the first lens 2 of the lens holder 14, as the first and second lenses 2, 3 are not attached to the lens holder 14, to load the jig 71 in position on the inner peripheral surface of the lens holder 14. The inner peripheral surface of the lens holder 14 is formed with a mounting surface 14*c* facing the object point side. The jig 71 is loaded with the reference surface 71*a* as an end face of the jig 71 in abutment against the mounting surface 14*c*.

By loading the jig 71 in this manner on the lens holder 14, the reference surface 71*a* of the jig 71 is protruded towards the optical axis side along the radius of the lens into abutment against the planar portion 3*d* of the second lens 3 whereby the reference surface 71*a* is constituted as a reference surface directed to the image point side.

That is, before mounting the first lens 2 on the lens holder 14, the second lens 3 is mounted on the lens holder 14 with the reference surface 71*a* of the jig 71 as a reference. In mounting the second lens 3 on the lens holder 14, the planar portion 3*d* of the incident surface 3*b* of the second lens 3 is abutted against the reference surface 71*a*. Since the reference surface 71*a* has a positioning function similar to that of the first reference surface along the optical axis 14*a*1, the second lens 3 is positioned as it is controlled as to the position along the optical axis and tilt. Thus, in reality, the mounting surface 14*c*, formed on the lens holder 14 in the same direction as the first reference surface along the optical axis 14*a*1 of the first mounting portion 14*a*, has the function similar to that of the second reference surface for the optical axis direction 4*b*1, and operates as the second reference surface along the optical axis direction for controlling the position along the optical axis and tilt of the second lens 3.

The end face of the jig 71 may be configured so that the virtual surface containing the apex points of the projections carrying the lens at at least three positions proves the reference surface 71*a*, as in the case of the above-described holder 70. Specifically, the reference surface 71*a* of the jig 71 is arranged as three-point boss-like projections on the inner peripheral surface of the jig 71. By this, the second lens 3 is positioned by having the optical axis direction position and tilt controlled by the reference surface made up of an imaginary plane including the projections.

After the second lens 3 is positioned on the lens holder 14 and securing the second lens 3 with respect to the holder 14, using an adhesive, the jig 71 is dismounted from the lens holder 14. Since the jig 71 is not kept attached to the lens holder 14, in contradistinction from the holder 70, the weight of the entire objective lens device 1 can be reduced to raise the performance of the actuator driving the objective lens device 1.

The reference surface supporting the second lens 3 may also be arranged as three-point boss shape in the case of the lens holder 4 described above. In this case, the projection 4*d* in the lens holder 4 may be designed as the aforementioned three-point boss shape.

Figure 6:
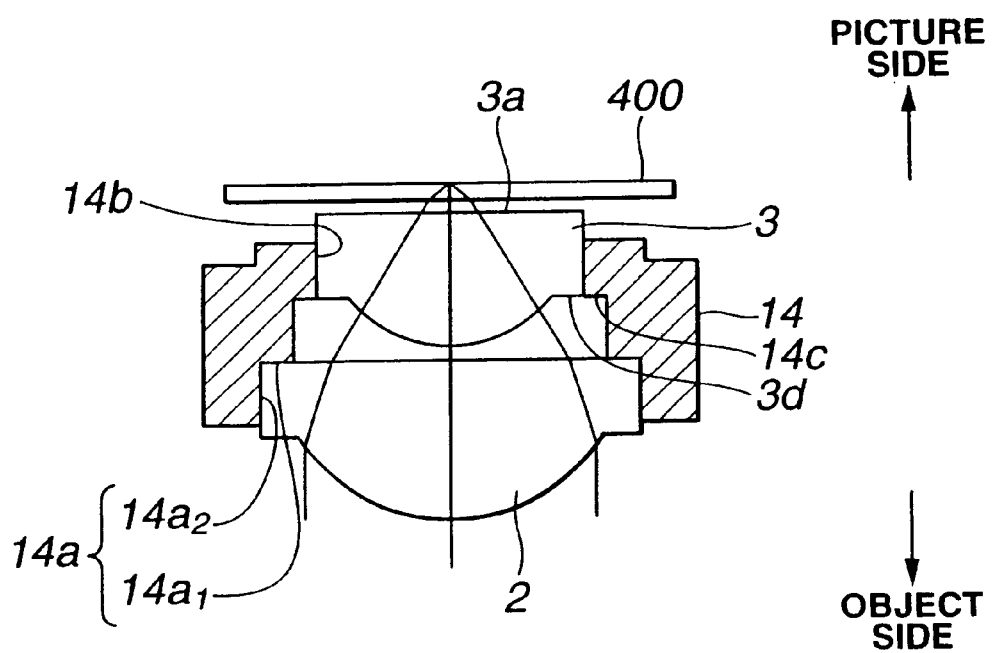
FIG. 6 is a longitudinal cross-sectional view showing the structure of an objective lens device in which two sets of the objective lenses are held by a lens holder according to a second embodiment of the present invention.
Figure 10:
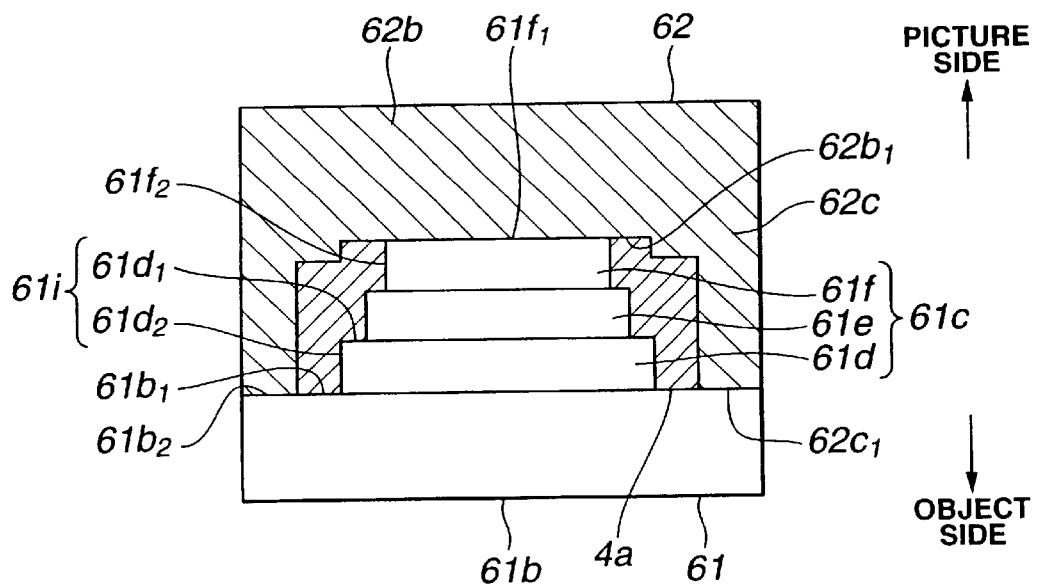
FIG. 10 is a longitudinal cross-sectional view showing the state in which a metal die for manufacturing the lens holder and the state in which a molding material is charged into the metal die for manufacturing the lens holder, with the metal die having a first metal die and a second metal die used for using the lens holder of the second embodiment.

FIG. 10 shows a metal die for producing the lens holder having a first metal die 61 and a second metal die 62 used for manufacturing the lens holder 14 described above with reference to FIG. 6. This first metal die 61 is substantially of the same shape as the first metal die 51, whilst the second metal die 62 is substantially of the same shape as the second metal die 52.

The first metal die 61 is made up of a base 61*b* and a projection 61*c* provided on the base 61*b*, and is substantially convex-shaped in its entirety. The base 61*b* is subsequently in the shape of a flat plate. The base 61b is formed with a projection 61c at a mid portion of the major surface 61b1 of the base 61b. The vicinity of the outer periphery of the major surface 61b1 of the base 61b is an abutment surface 61b2 compressing against an abutment surface 62c1 of the second metal die 62 as later explained.

The projection 61c is formed as steps 61d, 61e, 61f progressively smaller in diameter towards the image point. In the projection 61c, the major surface 61f1 of the step 61f as a distal end of the projection 61c is a surface compressing against the major surface 61b1 of the second metal die 62.

In this first metal die 61, a first mounting portion forming portion 61i mounting the first lens 2 is made up of a surface 61d1 facing the image point side of the outer periphery of the step 61d and an outer peripheral surface 61d2 of the step 61d, whilst the second mounting portion forming portion 61j mounting the second lens 3 is made up of an outer peripheral surface 61f2 of the step 61f.

The second metal die 62 is made up of a substantially flat-plate-shaped bottom 62b and a sidewall section 62c set upright on the outer peripheral surface of the major surface 62b1 towards the object point side.

The vicinity of the mid portion of the major surface 62b1 of the bottom 62b is an abutment surface compressing against the major surface 61f1 of the step 61f of the first metal die 61.

The sidewall section 62c is a portion of the second metal die 62 lying on the outer periphery of the projection 61c of the first metal die 61, with the end face 62c proving an abutting surface compressing against the abutment surface 61b2 of the first metal die 61.

In the state in which the metal molds 61, 62 are assembled together as shown in FIG. 10, the molding material 4a is charged into the gap between the metal molds 61, 62 to produce the lens holder 14 by die molding.

The objective lens device 1 is constituted by mounting the two objective lens sets made up of the first and second lenses 2, 3 on the lens holders 4, 14 described above. The lens holders 4, 14 are manufactured using a metal die for manufacturing the lens holder having first and second metal dies.

The lens holders 4, 14 are formed with a first mounting portion and a second mounting portion extending in the same direction with respect to the optical axis direction. Thus, by the first and second mounting portion forming portions, provided on the same metal die, the lens holders 4, 14 are formed with the first mounting portion and the second mounting portion. The molding portions forming the mounting portions carrying the respective lenses are formed on the same metal die, so that, if offset is produced as to the eccentricity, tilt or the separation when the two metal dies are assembled together, the relative position between the first and second mounting portions may be maintained without being affected by the amount of offset between the metal dies to form the lens holders 4, 14. Thus, the lens mounting portions of the lens holders 4, 14 depend only on the errors in the machining precision of the metal molds, as to errors in the relative position, such that, if the objective lens device 1 is assembled free of adjustment, it is possible to suppress errors as to the eccentricity, tilt and separation between the first and second lenses 2, 3. This diminishes optical aberration caused by the offset in assembling the metal mold.

That is, since the mounting portion forming portions for forming the lens mounting portions are provided in their entirety on the same metal die, only the metal mold producing error affects the three elements. For example, since the eccentricity, tilt and separation are derived only from the manufacturing error of the sole metal die, the eccentricity and separation amount only to approximately 3 $\mu$m, whilst the tilt is 0.02°. In this case, the wavefront aberration WFE for the eccentricity is 0.005 rms$\lambda$, that for the separation error is 0.012 rms$\lambda$ and that for tilt is 0.008 rms$\lambda$, such that the ideal optical imaging can be sufficiently smaller than the Mareshall criterion value WFE of 0.7 rms$\lambda$ as a threshold value.

If the mounting portion forming portions are provided in the different metal dies, the manufacturing error of the metal dies 301, 302 add up to the combined offsets, so that the offset and the separation are approximately 13 $\mu$m, whilst the tilt is approximately 0.087°, so that, even if the lenses 2, 3, which are the same as those of the objective lens device 1 of the present invention, are used in the lens holder 204, wavefront aberration WFE for the eccentricity is 0.023 rms$\lambda$, that for the separation error is 0.051 rms$\lambda$ and that for tilt is 0.035 rms$\lambda$, which are larger than those with the lens holder 14 of the present invention.

Since the lenses 2, 3 can be mounted on the lens holders 4, 14 to high precision without adjusting the mounting positions, shape designing of the lens holders 4, 14 can be optimized sufficiently. Also, since the lenses 2, 3 can be mounted on the lens holders 4, 14 to high precision without adjusting the mounting positions, mass production becomes feasible with a reduced production cost.

Since the first and second mounting portions are mounted facing a given direction along the optical axis on the lens holders 4, 14, the lenses 2, 3 can be assembled easily. For example, when mounting the respective lenses 2, 3, this operation can be performed without re-attaching the lens holders 4, 14 to the lens holder holding members.

Also, if the diameters of the reference surface in the radial direction of the first and second mounting portions of the lens holders 4, 14 are set so as to be slightly smaller than the outside diameters of the lenses 2, 3, and the lenses are mounted in position by press-fitting, the lenses 2, 3 can be mounted easily on the lens holders 4, 14, whilst the lenses 2, 3 can be positioned easily in the radial direction. That is, if there is a gap in the radial direction of the lens between the lens holder and the lens mounted thereon, the lens is offset in an amount corresponding to the gap at the maximum. Such offset of the lenses 2, 3 may be eliminated by press-fitting the lenses 2, 3 on the lens holders 4, 14.

The molding precision is easy to secure by forming the lens holders 4, 14 from the thermohardening resin as a molding material. This permits high precision formation of the reference surface determining the positions of the lenses 2, 3. For example, if the outside diameter of the lens is approximately 3 mm, and the molding material is the thermoplastic resin, an eccentricity of approximately 10 $\mu$m is produced. If thermohardening resin is used, the eccentricity may be suppressed to approximately 3 $\mu$m.

The separation between the disc surface and the ultimate surface of the objective lens is termed the working distance. In the lens holder 14, this working distance of the objective lens can be diminished because the counter-surface 3a of the second lens 3 is protruded beyond the disc side end face of the lens holder 14 and there is no risk of a portion of the lens holder 14 protruding towards the disc from the ultimate surface of the objective lens (counter-surface 3a of the second lens 3). That is, the separation between the disc and the lens holder can be secured even in an optical system with an extremely narrow working distance of the objective lens.

It may be presumed that the amount of protrusion of the projection 4d of the lens holder 4 from the ultimate surface of the objective lens along the optical axis is not less than 0.5 mm, because sufficient strength of the projection formed of resin cannot be assured with the amount of protrusion not larger than 0.5 mm. Thus, with the lens holder 4, the working distance of the objective lens at least equal to 0.5 mm is required. Thus, with the lens holder 14 not provided with the projection 4d but capable of positioning and holding the second lens 3, the objective lens device can be constructed using an objective lens with the working distance not larger than 0.5 mm. With the objective lens with a high numerical aperture NA, especially an objective lens of the multi-lens-set structure, the working distance is reduced, so that the above configuration is effective if the numerical aperture NA is not less than 0.75 as in the case of the present two-set objective lens.

Since the double set objective lens, enabling the high numerical aperture NA, can be assembled to high precision, it is possible to maintain optimum performance of the objective lens to realize high density recording and large capacity of the information recording medium.

Moreover, if the reference surface of the holder 70 or the jig 71, controlling the position along the optical axis and tilt of the second lens 3 with respect to the lens holder 14, is constructed by three-point boss-like projections 70a1, 70a2, 70a3, the contact area of the second lens 3, holder 70 or the jig 71 can be reduced, so that, if impurities are invaded into the holder 70 or the jig 71 at the time point of assembling the second lens 3 on the lens holder 14, there is no risk of the impurities being captured between the second lens 3, holder 70 and the jig 71, so that the second lens 3 can be mounted in position on the lens holder 14. If, for example, the holder 70 and the jig 71 are formed to support the entire outer periphery of the second lens 3, it may be feared that the impurities be captured between the second lens 3, holder 70 and the jig 71 to produce the offset in tilt in the second lens 3. However, by supporting the second lens 3 at least at three points, the effect of the intrusion of the impurities can be eliminated to realize positioning of the second lens 3 without producing the offset in tilt.

In the above-described embodiment the objective lens device 1 is constituted by a double set objective lens. The present invention is, however, not limited to this configuration. That is, the lens holders 4, 14 may be configured to unify the three or more sets of lenses arrayed along the optical axis. In this case, the reference surface facing each lens may be provided along the optical axis for operating as the reference surface controlling the position along the optical axis and tilt of the lens.

In the above-described embodiment, the lens holders 4, 14 are fabricated by die molding. The present invention is, however, not limited to this configuration. For example, the lens holders 4, 14 may be produced by machining, in which case a cutting byte may be introduced from a given sole direction to a cutting work for forming the lens holder and hence the mounting portions of the lenses 2, 3 can be provided without re-attaching the cutting matrix to the tool to permit the mounting portions of the lenses 2, 3 to be formed to high precision.

An illustrative structure of the double set objective lens made up of the first and second lenses 2, 3 and an illustrative structure of the recording and/or reproducing apparatus for loading the objective lens device 1 are hereinafter explained.

In the following Table 1, the shape etc of the first and second lenses 2, 3 is shown.

TABLE 1

| | | | wavelength 63.5 nm | |
| numerical aperture NA/focal length/input pupil φ (0.85/1.7647 mm/ 3.00 mm) | | | refractive index | |
| | | on-axis separation | Nd/Abbe number vd | refractive index N at |
| surface | radius of curvature [mm] | [mm] | on line d | 635 nm |
| OBJ | ∞ | ∞ | | |
| STO | ∞ | 0.0 | | |
| S1 | R: 1.62730 C:−0.749875 E-4 K: −0.505660 D: −2.04775 E-3 A: −.207368 E-2 E: 0.0 B: −.999092 F: 0.0 | 1.643007 | 1.4955/81.6 | 1.494122 |
| S2 | R: 89.45684 C: −.332978 E-2 K: 0.0 D: 0.921202 E-3 A: −.291281 E-2 F: 0.0 B: −.459860 E-2 F: 0.0 | 0.248290 | | |
| S3 | R: 1.30215 C: 0.206089 E-3 K: −0.503781 D: 0.0 A: 0.193338 E-1 E: 0.0 B: 0.120697 F: 0.0 | 1.315085 | 1.58913/61.3 | 1.587011 |
| S4 | ∞ | 0.0 | | |
| S9 | ∞ | 0.149386 | | |
| S10 | ∞ | 0.1 | 1.51633/64.15 | 1.515014 |
| S11 | ∞ | 0.0 | | |
| IMG | ∞ | 0.0 | | | non-spherical formula $$X = \frac{Y^2/R}{1 + \{1 - (1+K)(Y/R)\}^{1/2}} + AY^4 + BY^6 + CY^8 + DY^{10} + EY^{12} + FY^{14}$$

X: depth from the surface apex
Y: height from the optical axis
R: near-axis R
K: conical constant TABLE 1-continued

| | wavelength 63.5 nm | | | |
|---|---|---|---|---|
| numerical aperture NA/focal length/input pupil $\phi$ (0.85/1.7647 mm/ 3.00 mm) | | refractive index | | |
| surface radius of curvature [mm] | on-axis separation [mm] | Nd/Abbe number vd on line d | refractive index N at 635 nm | |

A: non-spherical coefficients of $Y^4$ term; B: non-spherical coefficients of $Y^6$ term; C: non-spherical coefficients of $Y^8$ term; D: non-spherical coefficients of $Y^{10}$ term; E: non-spherical coefficients of $Y^{12}$ term; F: non-spherical coefficients of $Y^{14}$ term In this Table 1, an object is OBJ, an aperture stop is STO and the lens surfaces are S1, S2, S3, . . . , with the disc recording surface being an imaging surface (IMG).

Figure 12A:
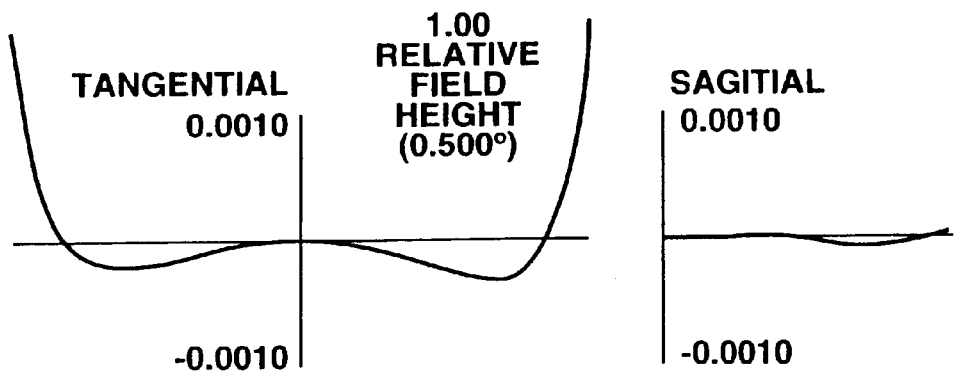
FIGS. 12A and 12B are graph showing the transverse aberration of the double lens set.
Figure 12B:
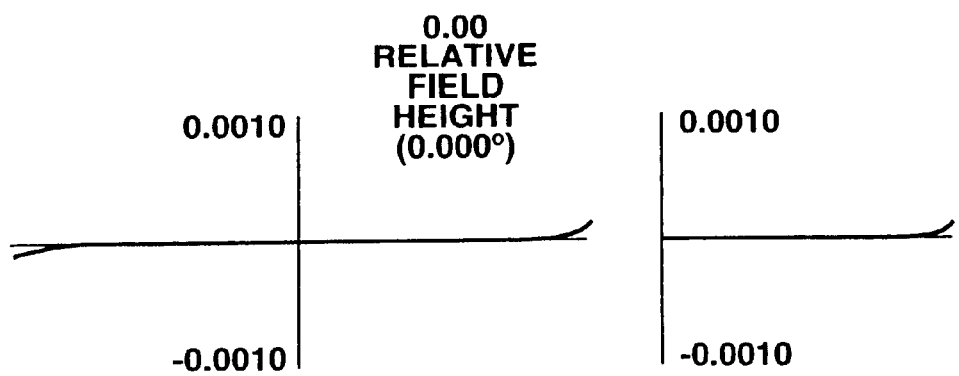

FIGS. 11 and 12 show optical characteristics of the optical system by the double set objective lens. FIGS. 11a, 11b and 11c denote the spherical aberration, non-spherical aberration and distortion aberration, respectively. FIGS. 12a and 12b denote the transverse aberration with the angle of field of 0.50 and the transverse aberration on the axis, respectively.

Figure 13:
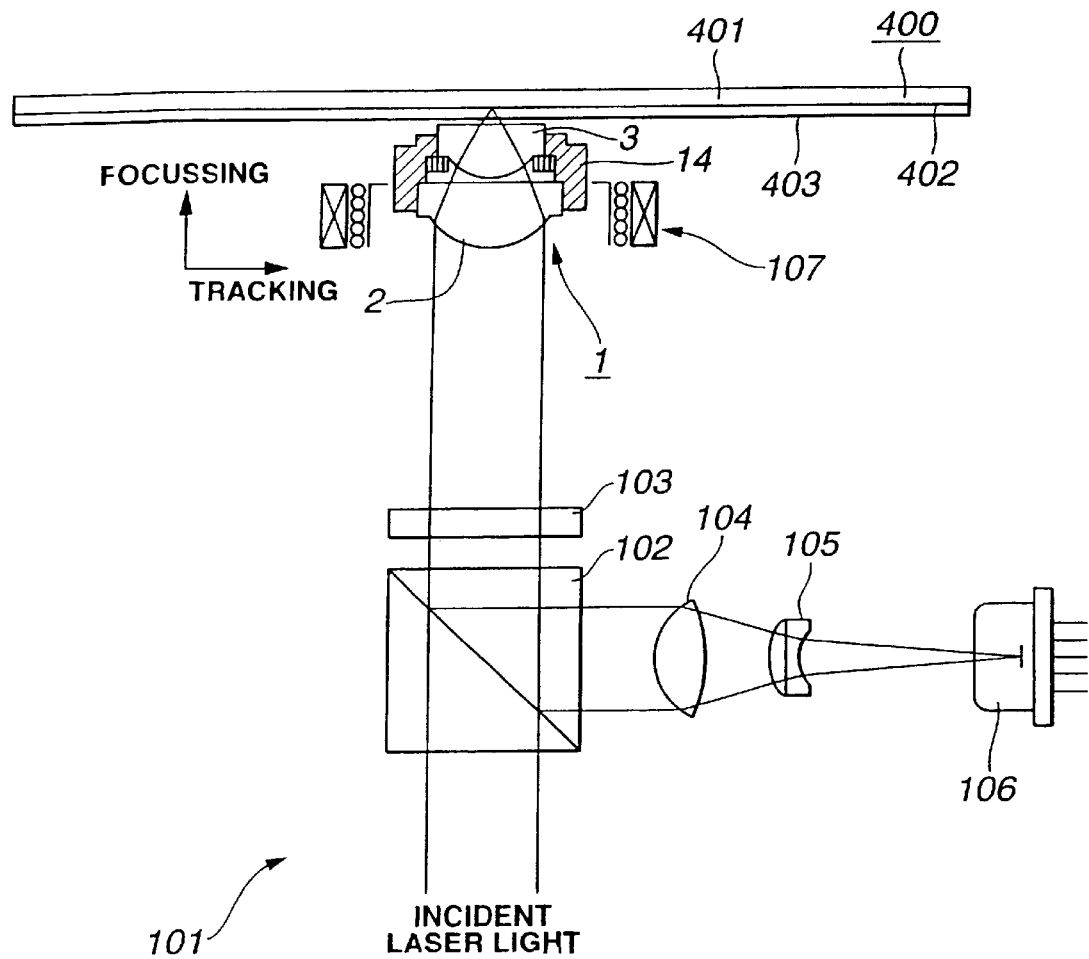
FIG. 13 is a schematic view showing an optical head.

FIG. 13 shows an illustrative structure of an optical head having the above-described objective lens device 1. An optical head 101 is loaded on a recording and/or reproducing apparatus for recording and/or reproducing the information for a disc (information recording medium) 400, and operates for radiating the laser light to the disc and for detecting the return light from the disc 400.

In the following description, the disc 400 is a phase-change optical disc for which the information signals are to be recorded and/or reproduced. However, the information recording medium may also be a replay-only optical disc, a magneto-optical disc or an optical card. The phase-change optical disc is substantially a flat disc comprised of a substrate 401 on which a recording layer 402 and a protective layer 403 are layered in this order.

The optical head 101 includes a light source, not shown, a polarizing beam splitter 102, a quarter wave plate 103 and an objective lens device 1 having a double set objective lens. A diffraction grating and a collimator lens, not shown, are arranged between the light source and the polarizing beam splitter 102.

The light source is a semiconductor laser radiating a linear polarized laser light of, for example, 635 nm. The light source radiates the laser light of a constant output for reproducing information signals from the disc 400, while modulating the intensity of the radiated laser light depending on the information signals for recording, for recording the information signals on the disc 400. There is no particular limitation to the wavelength λ of the laser light radiated from the light source. It is more desirable to use the laser light of a shorter wavelength for achieving a higher recording density and a larger recording capacity.

The laser light radiated from the light source is diffracted by a diffraction grating, not shown, and thereby split into a zero order light, +1 order light and a −1 order light. The order zero light and the ±1 order light are passed through a collimator lens, not shown, to a collimated light beam.

The incident laser light, thus collimated by the collimator lens, is transmitted through the polarizing beam splitter 102 to fall on the quarter wave plate 103. The light beam on passing through the quarter wave plate 103 is turned into a circular polarized light which then falls on the objective lens device 1.

The objective lens device 1 has the first lens 2 and the second lens 3, as explained above. In the present embodiment, the objective lens device 1 includes the lens holder 14. The laser light, turned into the circular polarized light by being passed through the quarter wave plate 103, is transmitted through the first and second lenses 2, 3 of the objective lens device 1 so as to be collected on the signal recording surface which is the surface of the recording layer 402 of the disc 400.

The incident light, collected on the signal recording surface of the disc 400, is reflected by this signal recording surface to prove the return light, which then is transmitted through the objective lens of the objective lens device 1 to fall on the quarter wave plate 103. This return light is transmitted through the quarter wave plate 103 to prove a linear polarized light beam, rotated 90° with respect to the forward light polarizing direction. This linear polarized light beam then is reflected by the reflecting surface of the polarizing beam splitter 102.

The return light, reflected by the polarizing beam splitter 102, is passed through a focussing lens 104 and a multiple lens 105 for detection by a photodetector 106.

The multiple lens 105 produces the astigmatic aberration for the incident light beam. This astigmatic aberration enables focussing servo signals to be detected by the astigmatic aberration by the so-called astigmatic aberration method. The photodetector 106 includes e.g., six photo-diodes and outputs electrical signals consistent with the intensity of the return light of the incident light on the respective photodiodes.

The recording and/or reproducing apparatus applies pre-set processing on the electronic signals outputted by the photodetector 106 to generate focussing servo signals and tracking servo signals by the astigmatic aberration method and by the so-called three-beam method, respectively, to drive a biaxial actuator 107. Based on the focussing servo and focussing servo signals, the biaxial actuator 107 actuates the objective lens device 1 along the optical axis of the objective lens and along the radius of the disc 400.

The photodetector 106 also processes the electrical signals consistent with the intensity of the return light incident on the respective photodiodes to generate and output playback signals from the disc 400.

It is thus possible for the optical head 101 having the objective lens device 1 to write and reads out information signals for the disc 400.

Figure 14:
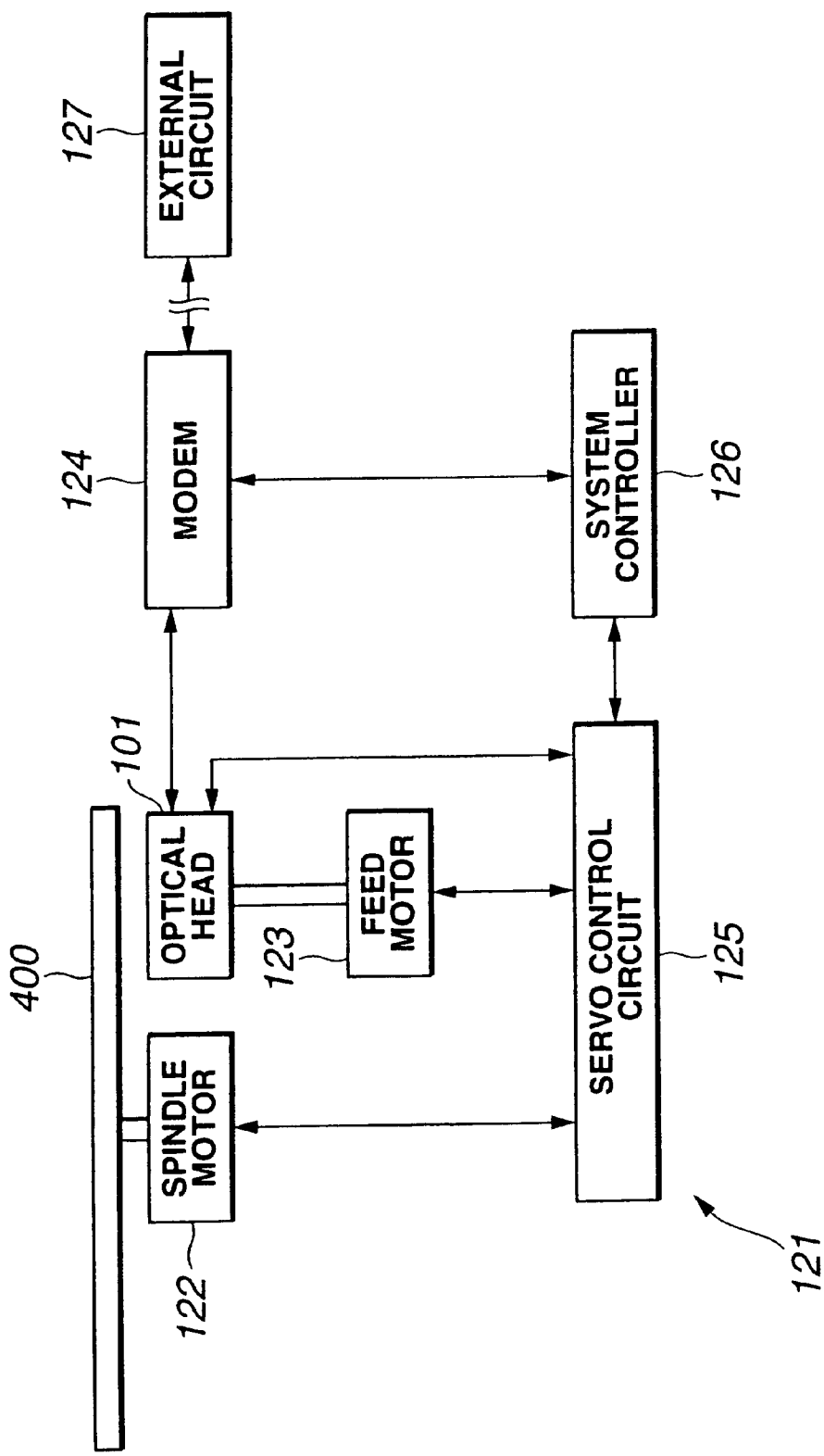
FIG. 14 is a block diagram showing a recording and/or reproducing apparatus.
Figure 15:
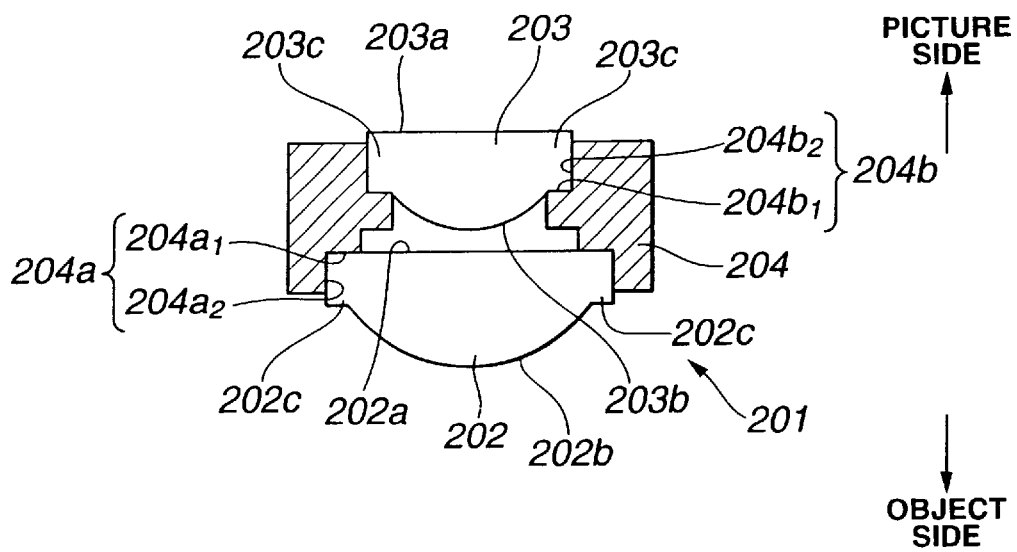
FIG. 15 is a longitudinal cross-sectional view showing the structure of an objective lens device holding the double objective lens set by a conventional lens holder.
Figure 16:
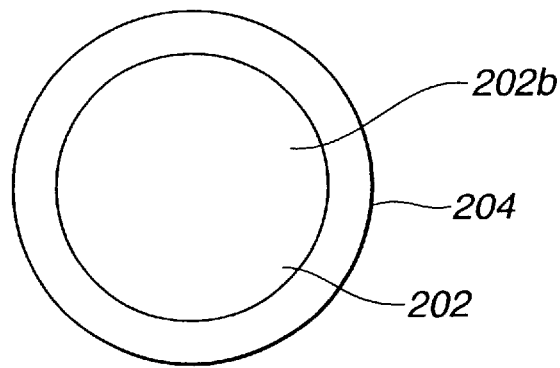
FIG. 16 is a longitudinal cross-sectional view showing the structure of an objective lens device in which two sets of the objective lenses are held by the conventional lens holder.
Figure 17:
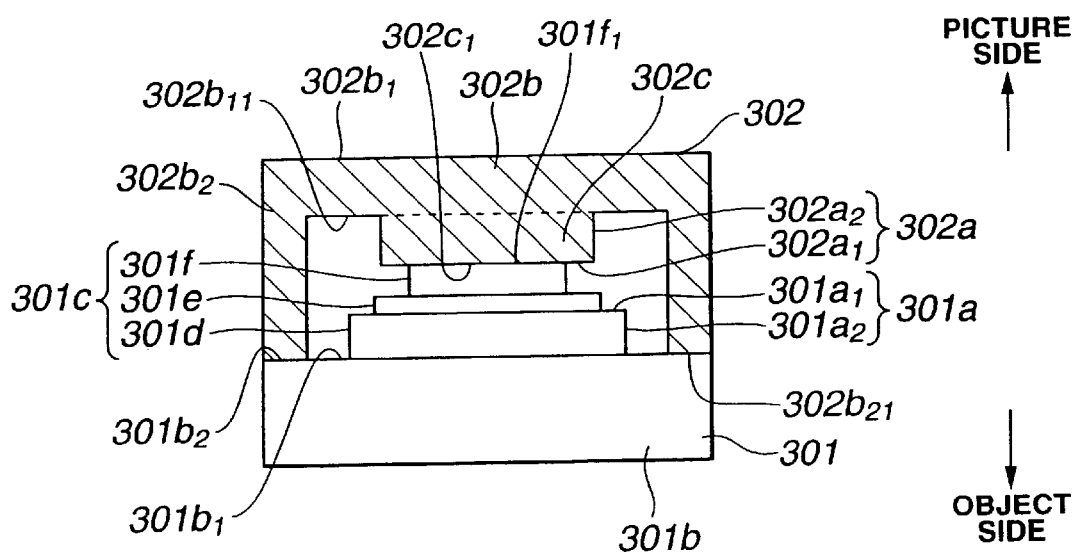
FIG. 17 is a longitudinal cross-sectional view showing a metal mold for manufacturing the lens holder having first and second metal dies used for manufacturing the conventional lens holder.
Figure 18:
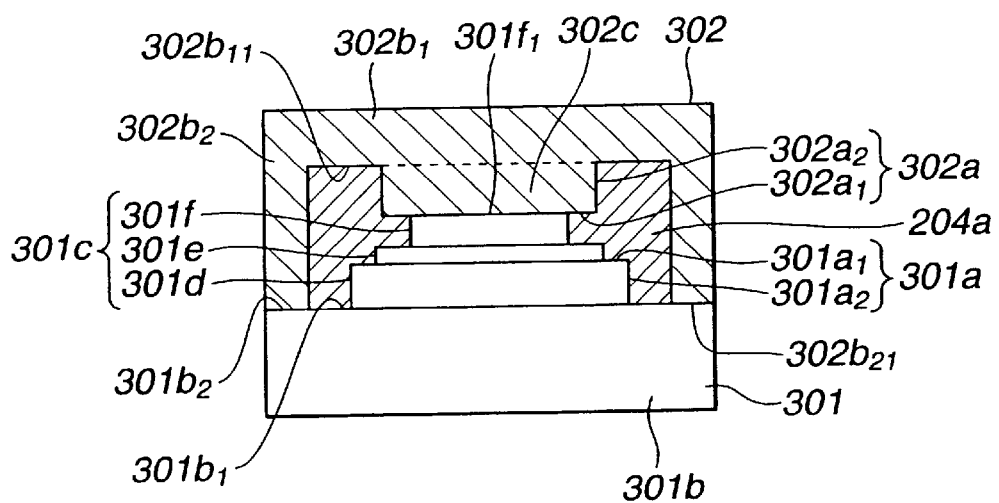
FIG. 18 is a longitudinal cross-sectional view showing a metal die for the lens holder charged with the material for molding the conventional lens holder.
Figure 19:
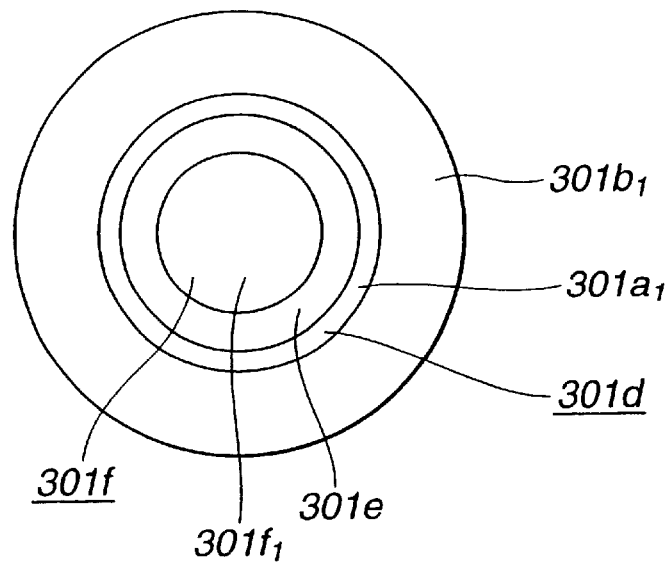
FIG. 19 is a plan view showing the first metal die of the metal die for molding the conventional lens holder.
Figure 20:
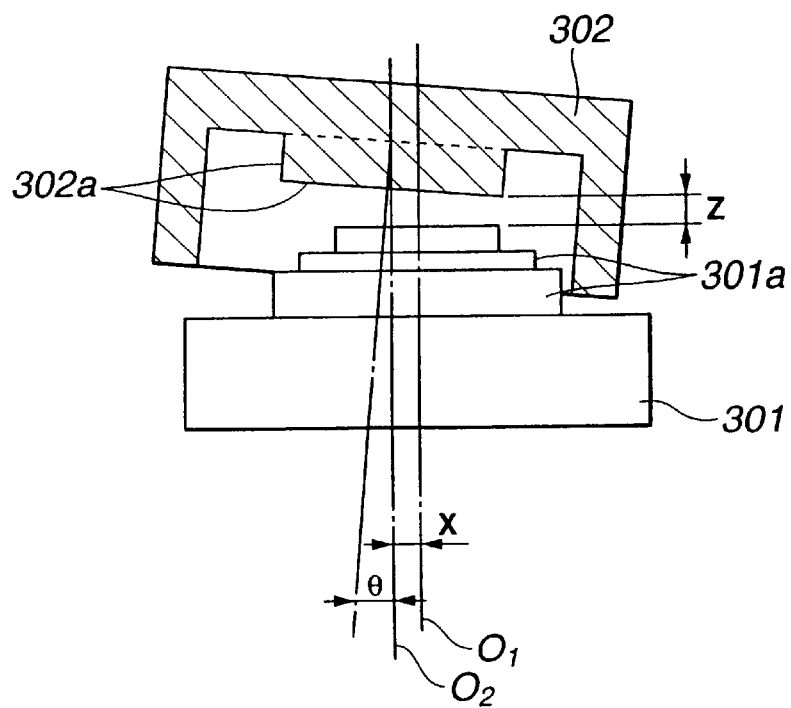
FIG. 20 is a plan view showing the conventional lens holder in which the second metal die is offset from the first metal die.
Figure 21:
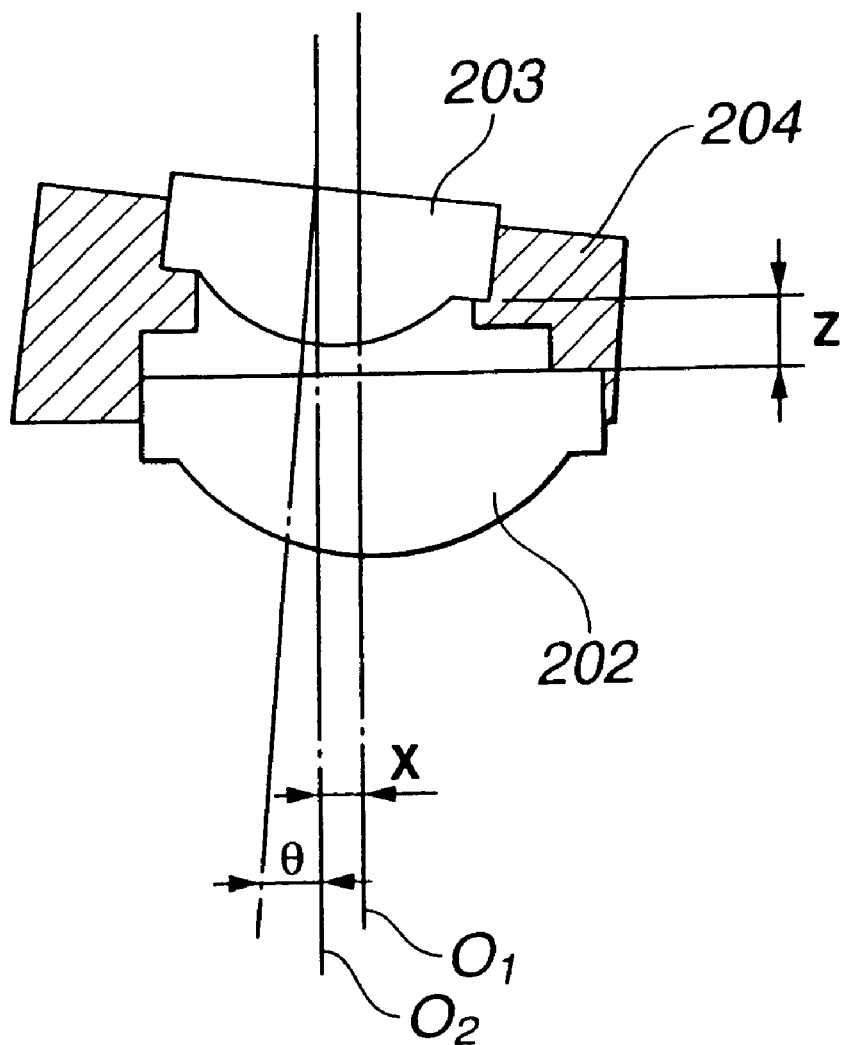
FIG. 21 is a longitudinal cross-sectional view showing the structure of the double objective lens set having the conventional lens holder produced as the second metal die is offset from the first metal die.

An embodiment of a recording and/or reproducing apparatus having this optical head 101 is explained. Referring to FIG. 14, this recording and/or reproducing apparatus includes a spindle motor 121 for rotationally driving the disc 400, the optical head 101, a feed motor 122 for causing movement of the optical head 101, a modem 124 for performing pre-set modulation and demodulation operations, a servo control circuit 125 for performing servo control of the optical head 101 and a system controller 126 for performing overall system control.

The spindle motor 121 rotationally drives the disc 400, loaded on a rotary table, not shown, at a pre-set rpm, and is driven based on a control signal from the servo control circuit 125.

The optical head 101 is connected to the modem 124. In recording information signals on the disc 400, the optical head 101 illuminates the laser light, subjected to light intensity modulation, on the disc 400. The laser light has been modulated in light intensity based on signals outputted by an external circuit 127 and modulated in a pre-set manner by the modem 124.

In reproducing information signals, the optical head 101 illuminates the laser light of a pre-set output on the disc 400 to generate playback signals from the return light to route the playback signals to the modem 124.

This optical head 101 is also connected to the servo control circuit 125. The optical head 101 generates focussing servo signals from the return light from the disc 400 to route the servo signals to the servo control circuit 125. The servo control circuit 125 performs focussing and tracking control by the biaxial actuator 107 under control by the system controller 126.

The modem 124 is connected to the system controller 126 and modulates the recording and/or reproducing signals under control by the system controller 126.

A feed motor 123 operates for feeding the optical head 101 to a pre-set radial position of the disc 400 and is driven under a control signal from the servo control circuit 125.

The servo control circuit 125 controls the spindle motor 122 and the feed motor 123 under control by the system controller 126.

With the above-described recording and/or reproducing apparatus 121, the information can be recorded and/or reproduced on or from the disc 400.

With the recording and/or reproducing apparatus 121, employing the objective lens device 1 having the double set objective lens in which no position offset is produced between the first and second lenses 2, 3 in the manufacturing process, information signals can be recorded and/or reproduced on or from the disc 400 without containing the deterioration produced by the above-mentioned three elements of the errors.

What is claimed is:

1. A lens holder carrying an objective lens formed by a plurality of lenses arrayed on an optical axis of an optical head adapted for recording and/or reproducing information signals for an information recording medium using the laser light, said lenses making up an objective lens device, said lens holder comprising:
    a plurality of reference surfaces that include two step-wise surfaces facing a same direction and configured to establish respective positions of said plurality of lenses along the optical axes and respective tilt of the plurality of lenses, said reference surfaces oriented to control the positions along the optical axes and the tilt of the lenses.

2. The lens holder according to claim 1 having two reference surfaces for supporting the two sets of lenses arrayed on the optical axis.

3. The lens holder according to claim 1 wherein a reference surface in the radial direction for positioning the lens along its radius is provided adjacent to the reference surface.

4. The lens holder according to claim 3 wherein the lens holder is formed of an elastic material and wherein the lens is press-fitted to the radial reference surface.

5. The lens holder according to claim 1 wherein the reference surface is an imaginary plane containing apex points of projections supporting the lens at at least three positions.

6. The lens holder according to claim 1 wherein the lens holder is formed by die molding.

7. The lens holder according to claim 1 wherein the lens holder is formed of a thermohardening resin.

8. The lens holder according to claim 1 wherein the lens holder supports an objective lens with a numerical aperture not less than approximately 0.75.

9. The lens holder according to claim 1 wherein the working distance between the information recording medium and the objective lens is not less than approximately 0.5 mm.

10. The lens holder according to claim 1 wherein the lens holder supports an objective lens in an optical head having a light source radiating the laser light and light reception means for receiving the laser light reflected back from the light source.

11. A method for manufacturing a lens holder carrying an objective lens formed by a plurality of lenses arrayed on an optical axis of an optical head adapted for recording and/or reproducing information signals for an information recording medium using the laser light, by injection molding means, using a metal die including at least a female die and a male die, said lenses making up an objective lens device, comprising steps of:
    positioning at least a portion of the male die within the female die;
    charging a molding material into a cavity between the male die and the female die and forming on a reference portion forming portion of only one of said male die and said female die a plurality of step-wise reference portions for said lens holder.

12. The manufacturing method according to claim 11 wherein
    the lens holder is formed from a thermohardening resin.

13. The manufacturing method according to claim 11 wherein:
    each reference portion having a reference surface positioned to control by a reference portion molding portion.

14. The manufacturing method according to claim 13 wherein a plurality of reference surfaces of plural reference portions are formed in a sole direction along the optical axis of the objective lens.

15. The manufacturing method according to claim 14 wherein the reference portions are formed by the reference portion molding portion as having reference surfaces for the radial direction for positioning the lenses of the objective lens along the radial directions of the lenses.

16. The manufacturing method according to claim 15 wherein the reference portions are formed by the reference portion molding portion as having projections supporting the lenses of the objective lens at at least three positions so that imaginary planes containing the apex points of the projections prove to be the reference surfaces.

17. A metal die for manufacturing a lens holder having at least a female die and a male die, said metal die being used for manufacturing a lens holder carrying an objective lens formed by a plurality of lenses arrayed on an optical axis of an optical head adapted for recording and/or reproducing information signals for an information recording medium using the laser light, said lenses making up an objective lens device, comprising:
    a female die; and
    a male die positioned at least partially within said female die, said male die and said female die are configured to provide a cavity therebetween for receiving a charging material, a reference forming portion being formed on only one of said male die and said female die and including a plurality of step-wise reference portions for said lens holder.

18. The metal die for manufacturing a lens holder according to claim 17 wherein
said reference portion molding portion forms each reference portion as having a reference surface controlling the tilt and the position along the optical axis of each lens of the objective lens.

19. The metal die for manufacturing a lens holder according to claim 18 wherein
the portions of said reference portion molding portion forming the reference surface are formed in one direction.

20. The metal die for manufacturing a lens holder according to claim 18 wherein
said reference portion molding portion forms each reference portion as having a reference surface controlling the tilt and the position along the optical axis of each lens of the objective lens.

21. The metal die for manufacturing a lens holder according to claim 18 wherein
said reference portion molding portion forms each reference portion as having projections supporting the lenses of the objective lens at at least three positions, with imaginary planes containing apex points of the projections proving the reference surfaces.

22. An objective lens device for an optical head adapted for recording and/or reproducing information signals for an information recording medium using the laser light, said lenses making up an objective lens device, said objective lens device comprising:
an objective lens made up of a first lens and a second lens; and
a lens holder supporting said objective lens;
at least one surface of the first and second lenses having a mid portion formed as a lens surface, with an outer rim of said at least one surface defining a planar section perpendicular to the optical axis;
said lens holder having step-wise reference surfaces including a first reference surface and a second reference surface for mounting said first and second lenses, respectively, for controlling the tilt and the positions along the optical axes of the lenses, said reference surfaces being oriented in one direction along the optical axis, a planar portion of said first lens being co-planar with the first reference surface so as to support said first lens, and a planar portion of said second lens being co-planar with the second reference surface so as to support said second lens.

23. The objective lens device according to claim 22 wherein
said lens holder includes a first reference surface for the first radial direction formed adjacent to said first reference surface for positioning the first lens with respect to the radial direction of the first lens, and a second reference surface for the second radial direction formed adjacent to said second reference surface for positioning the second lens with respect to the radial direction of the second lens,
said first lens being supported with its peripheral surface compressing against the first reference surface in the radial direction, and
said second lens being supported with its peripheral surface compressing against the second reference surface in the radial direction.

24. The objective lens device according to claim 22 wherein
said first lens is supported by press-fitting into a cylindrical portion constituted by said reference surface for the first radial direction, and wherein said second lens is supported by press-fitting into a cylindrical portion constituted by said reference surface for the second radial direction.

25. The objective lens device according to claim 22 wherein
said first and second lenses are supported and secured by the lens holder with an adhesive.

26. The objective lens device according to claim 22 wherein
said first lens is supported by press-fitting into a cylindrical portion constituted by said reference surface for the first radial direction and by subsequently being secured with an adhesive to the lens holder, and wherein said second lens is supported. by press-fitting into a cylindrical portion constituted by said reference surface for the second radial direction and by subsequently being secured with an adhesive to the lens holder.

27. The objective lens device according to claim 22 wherein
at least one of said first and second lenses has its end face projected outwards from the end face of the lens holder.

28. The objective lens device according to claim 22 wherein
one of the first and second lenses which has its end face projected outwardly from the end face of the lens holder is of a smaller diameter than the other lens and has its planar portion positioned inwardly of the reference surface which is co-planar as the planar portion.

* * * * *

UNITED STATES PATENT AND TRADEMARK OFFICE
CERTIFICATE OF CORRECTION

PATENT NO. : 6,594,204 B1
DATED : July 15, 2003
INVENTOR(S) : Kenji Yamamoto et al.

It is certified that error appears in the above-identified patent and that said Letters Patent is hereby corrected as shown below:

Column 5,
Line 32, change "0.0670" to -- 0.067º --.

Column 8,
Line 3, change "11A" to -- 11A, --.
Lines 3 and 6, change "graph" to -- graphs --.

Column 9,
Line 8, change "first," to -- first --.

Column 11,
Line 5, change "5g" to -- 51g --.

Column 12,
Line 9, change "4b are formed are formed in" to -- 4b are formed in --.
Line 43, change "in." to -- in --.

Column 13,
Line 6, change "amounting" to -- mounting --.

Column 19,
Line 21, change "0.50" to -- 0.5º --.

Column 24,
Line 35, change "supported." to -- supported --.

Signed and Sealed this

Third Day of February, 2004

JON W. DUDAS
*Acting Director of the United States Patent and Trademark Office*